(12) United States Patent
Kanamori et al.

(10) Patent No.: US 7,297,743 B2
(45) Date of Patent: Nov. 20, 2007

(54) CURABLE COMPOSITION

(75) Inventors: Yuka Kanamori, Kobe (JP); Junji Takase, Akashi (JP)

(73) Assignee: Kaneka Corporation, Osaka (JP)

(*) Notice: Subject to any disclaimer, the term of this patent is extended or adjusted under 35 U.S.C. 154(b) by 20 days.

(21) Appl. No.: 10/475,020

(22) PCT Filed: Apr. 19, 2002

(86) PCT No.: PCT/JP02/03917

§ 371 (c)(1),
(2), (4) Date: Jan. 15, 2004

(87) PCT Pub. No.: WO02/085985

PCT Pub. Date: Oct. 31, 2002

(65) Prior Publication Data

US 2004/0127631 A1    Jul. 1, 2004

(30) Foreign Application Priority Data

Apr. 19, 2001 (JP) .............................. 2001-120961
Dec. 11, 2001 (JP) .............................. 2001-377683
Mar. 14, 2002 (JP) .............................. 2002-070538
Apr. 11, 2002 (JP) .............................. 2002-108861

(51) Int. Cl.
C08L 71/02      (2006.01)
C08L 101/00     (2006.01)
C08L 21/00      (2006.01)
C08G 65/32      (2006.01)
C08F 299/02     (2006.01)
C09D 171/00     (2006.01)

(52) U.S. Cl. .................. 524/523; 524/515; 524/522; 524/525; 524/528; 524/588; 525/104; 525/192; 525/221; 525/223; 528/15; 528/25

(58) Field of Classification Search .............. 524/523, 524/502, 515, 588; 525/104; 528/15, 25
See application file for complete search history.

(56) References Cited

U.S. PATENT DOCUMENTS 5,550,173 A * 8/1996 Hammond et al. ......... 523/122
5,648,427 A * 7/1997 Fujita et al. ................ 525/104
5,794,981 A * 8/1998 Flynn ......................... 283/109
6,300,407 B1 * 10/2001 Machleder et al. ......... 524/515
6,777,485 B1 * 8/2004 Ito et al. ..................... 524/588

FOREIGN PATENT DOCUMENTS

| EP | 0 108 946 A2 | | 5/1984 |
|---|---|---|---|
| EP | 0 265 929 A2 | | 5/1988 |
| EP | 5 1225 A | | 12/1992 |
| JP | EP 01-08946 A2 | * | 5/1984 |
| JP | EP 0108946 A2 | * | 5/1984 |
| JP | EP 0108946 A2 | * | 5/1984 |
| JP | 59-122541 | | 7/1984 |
| JP | 60-031556 | | 2/1985 |
| JP | EP 0525769 A1 | * | 7/1992 |
| JP | EP 0525769 A1 | * | 2/1993 |
| JP | EP 05-25769 A1 | * | 3/1993 |
| JP | 6 172631 A | | 6/1994 |
| JP | 7 23316 A | | 9/1995 |
| JP | 7-233316 A | | 9/1995 |
| JP | 2000 191912 A | | 7/2000 |
| JP | 2002-69288 A | | 3/2002 |
| WO | WO 85-00360 | * | 1/1985 |
| WO | WO 02/085985 A1 | * | 10/2002 |

OTHER PUBLICATIONS

"Plastics Additives" by Gachter/Muller, 4th Ed, Chapter 5, p. 396, 1993.*

* cited by examiner

Primary Examiner—Duane Smith
Assistant Examiner—Ives Wu
(74) Attorney, Agent, or Firm—Sughrue Mion Pllc.

(57) ABSTRACT

The object of the present invention is to significantly improve weather resistance over a long period of time of the cured product of the invention, while maintaining physical properties, such as tensile properties and rubber-like elasticity, at levels required of sealing compositions for use in general buildings.

The curable composition of the invention is a curable composition which comprises a vinyl polymer having a reactive silicon containing group (a), such as a (meth) acrylic polymer having a reactive silicon containing group, a polyoxyalkylene polymer having a reactive silicon containing group (b), such as a polyoxypropylene having a reactive silicon containing group, and a plasticizer having an acrylic component (c), such as an acrylic polymer, and is reacted and crosslinked in the presence of moisture to provide a rubbery cured product.

27 Claims, No Drawings

CURABLE COMPOSITION

TECHNICAL FIELD

The present invention relates to a novel curable composition comprising a polyoxyalkylene organic polymer having a reactive silicon containing group.

BACKGROUND ART

Room temperature-curable compositions based on polyoxyalkylene organic polymers having a reactive silicon containing group are not only inexpensive but also have various meritorious properties making them suitable for use as, inter alia, architectural sealants (called modified silicone sealants). While these are required to be satisfactory enough in various properties, weather resistance over a long period of time is no less important than mechanical properties, such as modulus, elongation at break, strength at break, etc., and many studies were undertaken in these respects. It has been found that, as far as mechanical properties such as modulus, elongation at break, and strength at break are concerned, addition of a phthalic ester or a polyether plasticizer results in the expression of characteristics suitable for sealing materials. With regard to weather resistance, it is disclosed in, inter alia, Japanese Kokai Publication Sho-59-122541 and Sho-60-031556 that weather resistance can be improved by blending a vinyl polymer having a reactive silicon containing group with a polyoxyalkylene organic polymer having a reactive silicon containing group as compared with the exclusive use of such a polyoxyalkylene organic polymer having a reactive silicon containing group alone.

For the purpose of obtaining a curable composition providing satisfactory mechanical properties and weather resistance over a long period of time, the inventors of the present invention prepared a curable composition by adding a phthalic ester or polyether plasticizer to a blend of a vinyl polymer having a reactive silicon containing group and a polyoxyalkylene organic polymer having a reactive silicon containing group on the basis of the above known technologies, investigated the composition, and found that whereas mechanical properties were improved in fact, there was still room for improvement in weather resistance.

SUMMARY OF THE INVENTION

The object of the present invention is to provide a curable composition having the tensile properties and rubber-like elasticity required of sealing compositions for general architectural use and markedly improved weather resistance over a long period of time as well.

The inventors explored in earnest for means of realizing improvements in weather resistance over a long period of time and found that the above object could be accomplished with a composition comprising a vinyl polymer having a reactive silicon containing group (a), a polyoxyalkylene polymer having a reactive silicon containing group (b), and a plasticizer having an acrylic component (c). The present invention has been developed as a consequence.

The present invention, therefore, comprises the following inventions.

(1) A curable composition
which comprises a vinyl polymer having a reactive silicon containing group (a), a polyoxyalkylene polymer having a reactive silicon containing group (b), and a plasticizer having an acrylic component (c).

(2) The curable composition according to paragraph (1), wherein the vinyl polymer having a reactive silicon containing group (a) is a (meth)acrylic polymer.

(3) The curable composition according to paragraphs (1) or (2),
wherein the polyoxyalkylene polymer (b) is at least one member selected from the group consisting of poly(ethylene oxide), poly(propylene oxide), polypropylene oxide-ethylene oxide copolymer, and poly(butylene oxide).

(4) The curable composition according to any one of paragraphs (1) to (3),
wherein the main chain skeleton of the polyoxyalkylene polymer (b) is a polymer synthesized by using a double metal cyanide complex catalyst.

(5) The curable composition according to any one of paragraphs (1) to (4),
wherein the number average molecular weight of the polyoxyalkylene polymer (b) is 500 to 50,000.

(6) The curable composition according to paragraph (5), wherein the number average molecular weight of the polyoxyalkylene polymer (b) is 1,000 to 30,000.

(7) The curable composition according to any one of paragraphs (1) to (4),
wherein the number average molecular weight of the polyoxyalkylene polymer (b) is not less than 12,000.

(8) The curable composition according to paragraph 7, wherein the number average molecular weight of polyoxyalkylene polymer (b) is not less than 15,000.

(9) The curable composition according to paragraph 8, wherein the number average molecular weight of polyoxyalkylene polymer (b) is not less than 16,000.

(10) The curable composition according to any one of paragraphs (3) to (9),
wherein the polyoxyalkylene polymer (b) is a polyoxypropylene polymer.

(11) The curable composition according to paragraph (10),
wherein the main chain skeleton of the polyoxyalkylene polymer (b) is a substantially straight-chain polymer.

(12) The curable composition according to any one of paragraphs (1) to (11),
wherein the reactive silicon containing group of the polyoxyalkylene polymer (b) is a group comprising one silicon atom and two hydrolyzable groups attached thereto.

(13) The curable composition according to paragraph (12),
wherein the reactive silicon containing group of the polyoxyalkylene polymer (b) is dimethoxymethylsilyl group.

(14) The curable composition according to any one of paragraphs (1) to (13),
wherein the number average molecular weight of the vinyl polymer having a reactive silicon containing group (a) is 5,000 to 30,000.

(15) The curable composition according to any one of paragraphs (1) to (14),
wherein the weight ratio of the vinyl polymer having a reactive silicon containing group (a) to the polyoxyalkylene polymer having a reactive silicon containing group (b) is 25/75 to 45/55.

(16) The curable composition according to any one of paragraphs (1) to (15),
wherein the number average molecular weight of the plasticizer having an acrylic component (c) is 500 to 15,000.

(17) The curable composition according to paragraph (16), wherein the number average molecular weight of the plasticizer having an acrylic component (c) is 1,000 to 8,000.

(18) The curable composition according to any of paragraphs (1) to (17),
wherein the amount of use of the plasticizer having an acrylic component (c) is 5 to 150 weight parts relative to a combined total of 100 weight parts of the vinyl polymer having a reactive silicon containing group (a) and polyoxyalkylene polymer having a reactive silicon containing group (b).

(19) The curable composition according to paragraph (18),
wherein the amount of use of the plasticizer having an acrylic component (c) is 10 to 120 weight parts relative to a combined total of 100 weight parts of the vinyl polymer having a reactive silicon containing group (a) and polyoxyalkylene polymer having a reactive silicon containing group (b).

(20) The curable composition according to paragraph (19),
wherein the amount of use of the plasticizer having an acrylic component (c) is 20 to 100 weight parts relative to a combined total of 100 weight parts of the vinyl polymer having a reactive silicon containing group (a) and polyoxyalkylene polymer having a reactive silicon containing group (b).

(21) The curable composition according to any one of paragraphs (1) to (20),
which further comprises another plasticizer in addition to the plasticizer having an acrylic component (c).

(22) The curable composition according to paragraph (21),
wherein the weight ratio of the plasticizer having an acrylic component (c) to said other plasticizer is not less than 70/30.

(23) The curable composition according to any one of paragraphs (1) to (22),
which is for use as a siding board joint sealant.

(24) The curable composition according to paragraph (23),
wherein the siding board is a ceramic siding board.

(25) The curable composition according to any one of paragraphs (1) to (24),
which further comprises a scaly or particulate substance not smaller than 0.1 mm in diameter.

(26) The curable composition according to any one of paragraphs (1) to (24),
which further comprises a balloon.

(27) The curable composition according to paragraph (26),
wherein the diameter of the balloon is not less than 0.1 mm.

DETAILED DESCRIPTION OF THE INVENTION

The curable composition of the invention comprises a vinyl polymer having a reactive silicon containing group (a), a polyoxyalkylene polymer having a reactive silicon containing group (b), and a plasticizer having an acrylic component (c). The curable composition of the invention is now described in detail.

The technology of blending the vinyl polymer having a reactive silicon containing group (a) with the polyoxyalkylene polymer having a reactive silicon containing group (b) for use in the invention includes but is not limited to those specific methods described in, inter alia, Japanese Kokai Publication Sho-59-122541 and Sho-63-112642, Japanese Kokai Publication Hei-06-172631, and Japanese Kokai Publication Sho-60-228517.

The monomer for the vinyl polymer (a) according to the invention includes acrylates and methacrylates (hereinafter referred to sometimes as (meth)acrylates), such as methyl acrylate, methyl methacrylate, ethyl acrylate, ethyl methacrylate, butyl acrylate, butyl methacrylate, 2-ethylhexyl acrylate, 2-ethylhexyl methacrylate, benzyl acrylate, benzyl methacrylate, etc.; amide compounds, such as acrylamide, methacrylamide, N-methylolacrylamide, N-methylolmethacrylamide, etc.; epoxy compounds, such as glycidyl acrylate, glycidyl methacrylate, etc.; amino compounds, such as diethylaminoethyl acrylate, diethylaminoethyl methacrylate, aminoethyl vinyl ether, etc.; acrylonitrile, styrene, α-methylstyrene, alkyl vinyl ethers, vinyl chloride, vinyl acetate, vinyl propionate, and ethylene, among others. Particularly when the cured product is required to have rubber-like elasticity and weather resistance, (meth)acrylates, especially alkyl (meth)acrylates, are preferably included in a proportion of not less than 50 weight %. From the standpoint of compatibility with the polyoxyalkylene polymer having a reactive silicon containing group (b), it is preferable to use acrylate and/or methacrylate monomers derived from alcohols containing 10 or more carbon atoms (hereinafter referred to sometimes as (meth)acrylate monomers). However, it is not absolutely necessary to use such (meth)acrylate monomers derived from alcohols containing 10 or more carbon atoms but (meth)acrylate monomers, such as butyl acrylate and butyl acrylate-ethyl acrylate, which are not derived from alcohols of 10 or more carbon atoms, can also be employed.

From the standpoint of ease of handling, the vinyl polymer (a) is preferably a polymer having a number average molecular weight of 500 to 100,000. From the standpoint of improved elongation properties, greater weather resistance, and satisfactory workability of the cured product, a vinyl polymer having a number average molecular weight of 5,000 to 30,000 is still more preferred. The number average molecular weight of the vinyl polymer (a) can be determined by GPC in terms of polystyrene equivalent.

The reactive silicon containing group of said vinyl polymer (a) is represented by the general formula (1):

(wherein $R^1$ and $R^2$ each represents a substituted or unsubstituted univalent organic group containing 1 to 20 carbon atoms or a triorganosiloxy group; X represents hydroxyl group or a hydrolyzable group, which may be the same or varying over a plurality of occurrences; a represents an integer of 0, 1 or 2 and b represents an integer of 0, 1, 2 or 3, provided, however, that the condition of (sum of a's)+ b≧1 is satisfied; n represents an integer of 0 to 19). The reactive silicon containing group preferred from economic points of view is a group represented by the general formula (2):

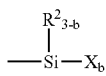

(2)

(wherein $R^2$ and X are as defined above; b represents an integer of 1, 2 or 3).

The average number of reactive silicon containing groups in the vinyl polymer (a) is at least one, preferably not less than 1.1, particularly preferably not less than 1.5 from the standpoint of providing sufficient curability.

The particular species of the hydrolyzable group in the formula (1) includes halogen atom, hydrogen atom, an alkoxy group, an acyloxy group, ketoximato group, amino group, amido group, aminoxy group, mercapto group, and an alkenyloxy group. Among these, alkoxy groups such as methoxy group and ethoxy group are preferred in consideration of the hydrolyzability under mild conditions.

As typical groups for $R^1$ and $R^2$ in the formula (1), alkyl groups, such as methyl group and ethylgroup; cycloalkyl groups, such as cyclohexyl group, etc.; aryl groups, such as phenyl group, etc.; and aralkyl groups, such as benzyl group, etc. can be mentioned. Furthermore, $R^1$ and $R^2$ may each be a triorganosiloxy group represented by the formula $R^3_3SiO$— ($R^3$ is the same as $R^1$). Among these, methyl group is particularly preferred.

As specific examples of said reactive silicon containing group, trimethoxysilyl group, triethoxysilyl group, triisopropoxysilyl group, dimethoxymethylsilyl group, diethoxymethylsilyl group, and diisopropoxymethylsilyl group can be mentioned.

The greater the number of hydrolyzable groups attached to the silicon atom, particularly to the same silicon atom, is, the higher the reactivity of the reactive silicon containing group is so that the curing speed of the composition of the invention tends to be increased. However, the elongation at break of the cured product is sometimes sacrificed. For example, trimethoxysilyl group is more reactive than dimethoxysilyl group, so that a polymer having a trimethoxysilyl group tends to be more reactive and higher in curing speed but smaller in the elongation at break after cure, than a polymer having a dimethoxymethylsilyl group. A curable composition with an improved curing speed may be obtained by using a vinyl polymer having a trimethoxysilyl group as said vinyl polymer (a) or using a vinyl polymer having a trimethoxysilyl group in combination with a polymer having a dimethoxymethylsilyl group. Furthermore, a curable composition with a high curing speed may also be obtained by introducing both kinds of groups into one and the same polymer. The amount of use of a highly reactive polymer, e.g. said polymer having a trimethoxysilyl group, and the relative amounts of said two groups in one and the same polymer can be judiciously selected so as to give a cured product having the desired elongation at break and curing speed, among other variables. The above practice is recommendable because it is easy to introduce a highly reactive functional group, such as trimethoxysilyl, into a vinyl polymer. The technology that can be used for introducing a reactive silicon containing group into the vinyl polymer (a) is described in, inter alia, Japanese Kokai Publication Sho-63-112642.

While the skeletal polymer of the vinyl polymer (a) is generally produced by the ordinary radical polymerization technique using a radical initiator, it can also be obtained by the living radical polymerization technique and other techniques as disclosed in Japanese Kokai Publication 2000-178456. When the ordinary radical polymerization technique is used, the molecular weight distribution (Mw/Mn) of the polymer is generally not less than 1.8 when the number average molecular weight is not less than 10,000. By the living radical polymerization technique, the polymer with a molecular weight distribution (Mw/Mn) of less than 1.8 or even 1.7 or 1.6 or less can be obtained. The molecular weight distribution (Mw/Mn) can be determined by GPC analysis (polystyrene equivalent).

The curable composition comprising a vinyl polymer with a broad molecular weight distribution as synthesized by the ordinary radical polymerization technique, typically the polymerization technique using an azo or peroxy radical initiator, and a polyoxyalkylene polymer having a reactive silicon containing group (b) undergoes a greater viscosity buildup and, hence, adversely affects workability as compared with the curable composition exclusively comprising the polyoxyalkylene polymer having a reactive silicon containing group (b) but may have a viscosity of the order permitting its use as a sealing material. Among vinyl polymers having a reactive silicon containing group, a (meth) acrylic polymer having a reactive silicon containing group is preferred but when such a polymer is synthesized by the ordinary radical polymerization technique, it is preferable to use an alkyl (meth)acrylate monomer having an alkyl group of not less than 10 carbon atoms, an alkyl (meth) acrylate monomer having an alkyl group of 1 to 8 carbon atoms, and an acrylic and/or methacyrlic monomer having a reactive silicon containing group to synthesize a random copolymer comprising such monomer units. It is also a preferred protocol to use an alkyl (meth) acrylate monomer having an alkyl group of 1 to 8 carbon atoms and an acrylic and/or methacrylic monomer having a reactive silicon containing group, without using an alkyl (meth) acrylate monomer having an alkyl group of not less than 10 carbon atoms, to synthesize a random copolymer comprising of such monomer units. Of course, these copolymers may additionally contain other monomer units. Referring to the random copolymer having a reactive silicon containing group, a further alternative protocol comprises using an acrylic and/or methacrylic monomer having such a functional group as OH instead of the acrylic and/or methacrylic monomer mentioned above to prepare a random copolymer according to the same polymerization technique as above and introducing a reactive silicon containing group into the copolymer through the utilization of said functional group.

The polyoxyalkylene polymer (b) includes polyoxyethylene, polyoxypropylene, polyoxybutylene, polyoxytetramethylene, poly(ethylene oxide-co-propylene oxide), and poly(propylene oxide-co-butylene oxide), among others.

Substantially any polyoxyalkylene polymer having a repeating unit of the general formula (3):

(3)

(wherein $R^4$ represents a bivalent organic group, preferably a straight-chain or branched-chain alkylene group of 1 to 14 carbon atoms) is particularly preferred because it has a comparatively low glass transition temperature and gives a cured product having satisfactory cold resistance.

Referring to the general formula (3), $R^4$ is preferably a straight-chain or branched-chain alkylene group of 1 to 14 carbon atoms, more preferably one of 2 to 4 carbon atoms. The repeating unit represented by the general formula (3) includes the folllowing species, among others.

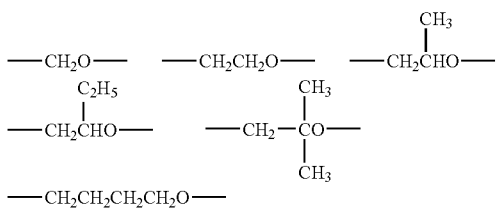

The main chain skeleton of the polyoxyalkylene polymer may comprise only one kind of repeating unit or two or more kinds of repeating units. Particularly when the curable composition is to be used as a sealant or an adhesive, the propylene oxide polymer, particularly a polymer predominantly composed of propylene oxide, namely a polymer containing 80 weight % or more, preferably 90 weight % or more, of propylene oxide, is preferred because of its non-crystallinity and comparatively low viscosity.

The technology of synthesizing a polyoxyalkylene polymer includes but is not limited to the polymerization method using an alkali catalyst, such as KOH, the polymerization method using a transition metal compound-porphyrin complex catalyst, such as the complex obtainable by reacting an organoaluminum compound with porphyrin, as described in Japanese Kokai Publication Sho-61-215623, for instance, the polymerization method using a double metal cyanide complex catalyst as disclosed in, inter alia, Japanese Kokoku Publication Sho-46-27250, Japanese Kokoku Publication Sho-59-15336, U.S. Pat. No. 3,278,457, U.S. Pat. No. 3,278,458, U.S. Pat. No. 3,278,459, U.S. Pat. No. 3,427,256, U.S. Pat. No. 3,427,334, and U.S. Pat. No. 3,427,335, and the polymerization method using a phosphazene as disclosed in Japanese Kokai Publication Hei-11-60723.

The polyoxyalkylene, such as polyoxypropylene, which has a number average molecular weight of not less than 10,000 is preferably synthesized using a double metal cyanide complex catalyst from production cost and other points of view.

The reactive silicon containing group of said polyoxyalkylene polymer having a reactive silicon containing group (b) is a group containing a hydroxyl group or other hydrolyzable group directly attached to a silicon atom and capable of crosslinking by forming a siloxane bond through the reaction catalyzed by a curing catalyst. As typical examples, there can be mentioned the groups represented by the general formula (4)

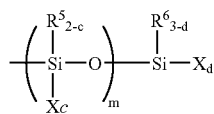 (4)

(wherein $R^5$ and $R^6$ each represents an alkyl group of 1 to 20 carbon atoms, an aryl group of 6 to 20 carbon atoms, an aralkyl group of 7 to 20 carbon atoms, or a triorganosiloxy group represented by the formula $R^7_3SiO-$ ($R^7$ represents a univalent hydrocarbon group of 1 to 20 carbon atoms; three $R^7$ groups may be the same or different); when two or more $R^5$ or $R^6$ groups are present, such groups may be the same or different; X represents a hydroxyl group or a hydrolyzable group and when two or more X groups are present, such groups may be the same or different; c represents 0, 1, or 2 and d represents 0, 1, 2, or 3; c need not be the same over m occurrences of the group represented by the general formula (5):

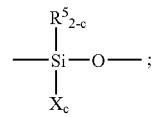 (5)

m represents an integer of 0 to 19; with the condition of (sum of c's)+d≧1 is satisfied).

The hydrolyzable group represented by X is not particularly restricted but may be a hitherto-known hydrolyzable group. Specifically, hydrogen atom, halogen atom, an alkoxy group, an acyloxy group, ketoximato group, amino group, amido group, acid amide group, aminoxy group, mercapto group, an alkenyloxy group, etc. may be mentioned. The preferred, among these, are hydrogen atom, an alkoxy group, an acyloxy group, ketoximato group, amino group, amido group, aminoxy group, mercapto group, and an alkenyloxy group and in view of the hydrolyzability under mild conditions and ease of handling, an alkoxy group is particularly preferred.

The hydrolyzable group and hydroxyl group may be attached, in 1 to 3 units per silicon atom, and the value of (sum of c's)+d is preferably in the range of 1 to 5. When two or more hydrolyzable and/or hydroxyl groups are present within the reactive silicon containing group, the groups may be the same or different.

The silicon atom forming said reactive silicon containing group may be singular or plural and when silicon atoms are linked together by siloxane bonding or the like, the number of silicon atoms may range up to about 20.

From availability points of view, reactive silicon containing groups represented by the general formula (6):

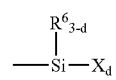 (6)

(wherein $R^6$ and X are as defined above; d is an integer of 1, 2 or 3) are preferred.

As examples of $R^5$ and $R^6$ in the above general formulas (4), (5), and (6), there can be mentioned alkyl groups such as methyl, ethyl, etc.; cycloalkyl groups such as cyclohexyl etc.; aryl groups such as phenyl etc.; aralkyl group such as benzyl etc.; and triorganosiloxy groups represented by the formula $R^7_3SiO-$ where $R^7$ is methyl or phenyl, for instance. Among these, methyl group is particularly preferred.

The more specific examples of said reactive silicon containing group are trimethoxysilyl group, triethoxysilyl group, triisopropoxysilyl group, dimethoxymethylsilyl group, diethoxymethylsilyl group, diisopropoxymethylsilyl group, and so forth.

The curing speed of the composition can be increased by introducing reactive silicon containing groups having high reactivity, such as trimethoxysilyl groups, into the polyoxyalkylene polymer. Particulars of this technology have already been discussed above.

The above introduction of reactive silicon containing groups can be carried out in the known manner. For example, the following methods may be mentioned.

(a) An organic polymer having a functional group, such as hydroxyl group, within the molecule is caused to react with an organic compound having an active group capable of reacting with said functional group and an unsaturated group to give an organic polymer having the unsaturated group, or copolymerized with an unsaturated group-containing epoxy compound to give an unsaturated group-containing organic polymer. The reaction product thus obtained is then hydrosilylated by permitting a hydrosilane having a reactive silicon containing group to act thereon.

(b) An unsaturated group-containing organic polymer prepared in the same manner as in (a) is reacted with a compound having a mercapto group and a reactive silicon containing group.

(c) An organic polymer having a functional group, such as hydroxyl group, epoxy group, or isocyanato group, within the molecule is reacted with a compound having a functional group capable of reacting with said functional group and a reactive silicon containing group. Referring to the above method, the reaction mode in which the compound having a reactive silicon containing group is reacted at the terminus of the organic polymer is preferred.

The polyoxyalkylene polymer having a reactive silicon containing group (b) may be straight-chain or branched. Assuming that the molecular weight is constant, use of a straight-chain polymer imparts a greater elongation at break to the cured product as compared with the use of a branched polymer but causes an increase in viscosity of the uncured composition so that the composition tends to become less easy to handle. Referring to the number average molecular weight of the polyoxyalkylene polymer having a reactive silicon containing group (b), its lower limit is preferably 500, more preferably 1,000, still more preferably 12,000. The upper limit is preferably 50,000, more preferably 30,000, still more preferably 25,0000. If the number average molecular weight is less than 500, the polyoxyalkylene polymer having a reactive silicon containing group tends to give a brittle cured product. If it exceeds 50,000, the functional group concentration is so low that the curing speed is sacrificed. The additional disadvantage is that the viscosity of the polymer is increased to make handling difficult. Particularly from the standpoint of viscosity of the polyoxyalkylene polymer having a reactive silicon containing group, the number average molecular weight is preferably between 1,000 and 30,000.

Along with the recent prolongation of the quality assurance period of housings, sealing materials are required to be free from the aging of performance with time. Under the circumstances the composition of the invention can be used in weather-resistant sealing material and other applications with advantage. Inclusive of architectural sealing materials, sealing materials in general are required to have high elongation at break. Sealing materials for ceramic siding boards which undergo marked shrinkage with time, in particular, are required to have high elongation at break.

By way of illustration, the test for sealing materials for ceramic sidings as established by the Japan Association Fiber Reinforced Cement Siding Manufacturers institutes that the elongation at break should be at least 250%. However, counting on aging of performance with time, among others, the elongation at break is preferably double this value, namely not less than 500% and, further preferably not less than 600%. The cured product available from a composition comprising the vinyl polymer having a reactive silicon containing group (a) and the polyoxyalkylene polymer having a reactive silicon containing group (b) is satisfactory in weather resistance but has been found to be poor in elongation at break as compared with the composition not containing the vinyl polymer having a reactive silicon containing group (a). Use of a vinyl polymer having a reactive silicon containing group giving only an insufficient elongation at break to a cured product is disadvantageous in that the freedom of formulation is limited, for a plasticizer must be used in a large quantity in order to obtain a sufficient elongation at break, for instance.

The inventors of the present invention discovered that the most effective method of improving the elongation at break of the cured product available from a curable composition comprising a vinyl polymer having a reactive silicon containing group (a) and a polyoxyalkylene polymer having a reactive silicon containing group (b) is to specify the number average molecular weight of the polyoxyalkylene polymer having a reactive silicon containing group (b) to be not less than 16,000. To improve the elongation at break of the cured product, it is more efficient to increase the molecular weight of the polyoxyalkylene polymer having a reactive silicon containing group (b) than increasing the molecular weight of the vinyl polymer having a reactive silicon containing group (a). Generally speaking, assuming that the kind of reactive silicon containing group and its amount per mole of the polymer are the same, increasing the molecular weight of the polymer results in a decreased density of the reactive silicon containing group and it is, therefore, reasonable to predict that the reaction rate of the reactive silicon containing group is decreased and the curing speed of the curable composition is also decreased. However, in the composition according to the invention, increasing the number average molecular weight of the polyoxyalkylene polymer having a reactive silicon containing group (b) to 16,000 or more results in little loss of curing speed.

Furthermore, increasing the molecular weight of the polyoxyalkylene polymer having a reactive silicon containing group (b) causes a decrease in the number of crosslinking sites and, hence, tends to sacrifice the weather resistance but the composition of the invention is advantageous in that substantially no aging of weather resistance was noted even after at least 2,000 hours of sunshine weatherometer exposure. From the standpoint of elongation at break, the number average molecular weight of the polyoxyalkylene polymer having a reactive silicon containing group (b) is preferably not less than 17,000, further preferably not less than 18,000, particularly preferably not less than 19,000. In consideration of the viscosity of the composition, the upper limit of molecular weight is 25,000, further preferably 23,000, particularly preferably 22,000.

When the number average molecular weight of the polyoxyalkylene polymer (b) is to be increased to 16,000 or more for improving the elongation at break of the cured product, the polyoxyalkylene polymer is preferably a straight-chain polymer having substantially no branches in order that a sufficient elongation at break may be expressed.

Furthermore, the reactive silicon containing group of the polyoxyalkylene polymer (b) is preferably a group such that two hydrolyzable groups are attached to one silicon atom, for example dimethoxymethylsilyl group.

The number average molecular weight of the polyoxyalkylene polymer having a reactive silicon containing group (b) in the context of the invention is the molecular weight meeting the following definition.

Thus, the number average molecular weight of said polymer (b) is defined herein to be the number average molecular weight (end-group molecular weight) determined by measuring terminal group concentration with direct titrimetry according to the principles of the hydroxyl value determining method as specified in JIS K1557 and the iodine value determining method as specified in JIS K0070 and taking the polyether oligomer structure into account. It can also be determined by plotting the polystyrene equivalent molecular weight found by the GPC analysis, which is a common relative method of determining the number average molecular weight, against the above end-group molecular weight to construct a calibration curve and converting the measured GPC molecular weight to the end-group molecular weight. Comparison of the molecular weight of the polymer prior to introduction of said reactive silicon containing group, such as an unsaturated group-containing polyoxyalkylene, with the molecular weight of the polymer into which said reactive silicon containing group has been introduced reveals that usually the molecular weight of the polymer into which said reactive silicon containing group has been introduced tends to be slightly larger but there is no remarkable difference.

The reactive silicon containing group of the polyoxyalkylene polymer (b) for use in the invention should exist in the number of at least 1, preferably 1.1 to 5, for each mole of the polymer on the average. If the number of reactive silicon containing groups in the polymer molecule is less than 1 on the average, curability will be insufficient. If the number is too large, the polymer network structure will be too dense to express good mechanical properties.

The reactive silicon containing group of the polyoxyalkylene polymer (b) for use in the invention may be present within the polyether molecular chain as a side chain or at the chain terminus. When the reactive silicon containing group is present as a side chain, the effective network chain amount in the ultimate cured product is smaller so that a rubbery cured product expressing high elastic modulus and low elongation at break is more likely formed. On the other hand, when the reactive silicon containing group is present in the neighborhood of the molecular chain terminus, the effective network chain amount in the ultimate cured product is large so that a rubbery cured product expressing high strength, high elongation at break, and low elastic modulus is more likely formed. Particularly when the reactive silicon containing group is present at the molecular chain terminus, the effective network chain amount in the ultimate cured product is maximized so that a cured product is suited for use as an architectural sealant desirably having large elongation at break in the sense of tensile properties and rubber-like elasticity in the sense of flexibility.

Specifically, the polyoxyalkylene polymer having a reactive silicon containing group (b) includes but is not limited to the polymers proposed in Japanese Kokoku Publication Sho-45-36319 and Sho-46-12154, Japanese Kokai Publication Sho-50-156599, Sho-54-6096, Sho-55-13767, Sho-55-13468, Sho-57-164123, Japanese Kokoku Publication Hei-03-2450, U.S. Pat. No. 3,632,557, U.S. Pat. No. 4,345,053, U.S. Pat. No. 4,366,307, U.S. Pat. No. 4,960,844, etc.; the polymers having reactive silicon containing groups, such as dimethoxymethylsilyl groups, as introduced by hydrosilylation, for instance, into polyoxyalkylene polymers having high molecular weights and narrow molecular weight distributions, namely number average molecular weights not less than 6,000 and Mw/Mn values not over 1.6, which are proposed in Japanese Kokai Publication Sho-61-197631, Sho-61-215622, Sho-61-215623, and Sho-61-218632, and the polymers having high molecular weights and narrow molecular weight distributions as disclosed in Japanese Kokai Publication Hei-03-72527.

The vinyl polymer having a reactive silicon containing group (a) largely contributes to the viscosity gain of the final composition and, hence, tends to degrade the workability but by using a polyoxyalkylene polymer having a reactive silicon containing group (b) having a Mw/Mn value of not more than 1.6, preferably not more than 1.5, it is possible to suppress the viscosity gain of the final composition and improve the workability. Such a polymer can be prepared from a polyoxyalkylene polymer synthesized by using a double metal cyanide complex catalyst. Even if a polymer with such a narrow molecular weight distribution is used as said polyoxyalkylene polymer having a reactive silicon containing group (b), it is likely that the use of a straight-chain polymer with a number average molecular weight of not less than 16,000 and, as the vinyl polymer having a reactive silicon containing group (a), a polymer prepared by the radical polymerization technique other than the living radical polymerization technique, such as a (meth) acrylic random copolymer, will result in a remarkable increase in the viscosity of the composition. However, the viscosity will still be of the order of about 100 Pa·s or 80 Pa·s, which permits use of the composition as a sealing material composition. Therefore, it will be unnecessary to use an extraordinary formulation including a solvent and an excessive amount of a plasticizer for viscosity reduction, for instance, or, if formulated, these need be used only in minor amounts.

Regarding the formulating ratio of the vinyl polymer having a reactive silicon containing group (a) to the polyoxyalkylene polymer having a reactive silicon containing group (b), the lower limit of (a)/(b) (by weight) is preferably 10/90, more preferably 25/75, still more preferably 30/70. The upper limit is preferably 90/10, more preferably 45/55. If this ratio is reduced to less than 10/90, that is to say the relative amount of the polyoxyalkylene polymer having a reactive silicon containing group (b) is increased, the weather resistance tends to become insufficient when the weather resistance of a modified silicone sealing material showing no aging after 2,000 hours of sunshine weatherometer exposure is regarded as a standard. On the other hand, if the ratio exceeds 90/10, that is to say the relative amount of the vinyl polymer having a reactive silicon containing group (a) is increased, the weather resistance will be improved but the composition tends to gain so much in viscosity as to degrade the workability.

In the case where an alkyl acrylate polymer and/or alkyl methacrylate polymer having a reactive silicon containing group is used as the vinyl polymer having a reactive silicon containing group (a) and a polyoxypropylene polymer having a reactive silicon containing group is used as the polyoxyalkylene polymer having a reactive silicon containing group (b), the (a)/(b) ratio is preferably within the range of 25/75 to 45/55. Particularly when a polyoxypropylene polymer having a reactive silicon containing group with a number average molecular weight of not less than 10,000, preferably not less than 16,000, especially preferably not less than 18,000, and a molecular weight distribution Mw/Mn=not more than 1.5 is employed, the (a)/(b) ratio is preferably within the range of 25/75 to 45/55. When the (a)/(b) ratio is 25/75 to 45/55, both sufficient weather resistance and workability can be well achieved. The more preferred range is 30/70 to 45/55.

The plasticizer having an acrylic component (c) for use in the invention includes polymers of acrylic monomers such as acrylates and acrylamides. The preferred are polymers inclusive of acrylate copolymers and copolymers of acrylates with other monomers. As specific acrylates, the acrylates indicated for use in the production of the (a) component of the invention can be mentioned by way of example. The preferred are alkyl acrylates, particularly alkyl acrylates having alkyl groups of 1 to 8 carbon atoms, such as butyl acrylate and ethyl acrylate. By adding such a plasticizer, not only the viscosity and slump of the curable composition and the mechanical properties, such as tensile strength and elongation at break, of the cured product obtained by curing the composition can be adjusted but also a good weather resistance can be maintained for a long time as compared with the use of a plasticizer not containing an acrylic component within the molecule. Furthermore, the use of the plasticizer having an acrylic component (c), particularly the acrylic polymer synthesized by the SGO process to be described hereinafter, results in a greater elongation at break of the cured product as compared with the use of any plasticizer other than the plasticizer having an acrylic component. Therefore, in manufacturing a sealing material with a large elongation at break of the ultimate cured product, which is especially required of sealing materials for siding boards, by using a polymer with a number average molecular weight of not less than 16,000 as the polyoxyalkylene polymer (b) as mentioned above, a plasticizer having an acrylic component (c) functions as a very suitable plasticizer.

The number average molecular weight of said plasticizer having an acrylic component (c) is preferably 500 to 15,000, more preferably 800 to 10,000, still more preferably 1,000 to 8,000. If the molecular weight is too low, heat and rain tend to cause release of the plasticizer with time to prevent long-term maintenance of initial physical properties and expression of improved weather resistance. On the other hand, if the molecular weight is too large, the viscosity tends to be increased to degrade the workability. Since the plasticizer having an acrylic component (c) acts as a plasticizer, its viscosity is usually lower than the viscosity of either one or both of the vinyl polymer having a reactive silicon containing group (a) and polyoxyalkylene polymer having a reactive silicon containing group (b). Particularly, the viscosity of the plasticizer having an acrylic component (c) is preferably lower than the viscosity of the polyoxyalkylene polymer having a reactive silicon containing group (b). Referring to number average molecular weight, too, the number average molecular weight of the plasticizer having an acrylic component (c) is preferably lower than the number average molecular weight of either one or both of the vinyl polymer having a reactive silicon containing group (a) and polyoxyalkylene polymer having a reactive silicon containing group (b) by not less than 1,000, more preferably not less than 2,000, still more preferably not less than 3,000. The number average molecular weight of the plasticizer having an acrylic component (c) can be determined by GPC as the polystyrene equivalent. The molecular weight distribution (Mw/Mn) can also be determined by GPC (polystyrene equivalent method).

Specifically, the plasticizer having an acrylic component (c) includes but is not particularly limited to the (meth) acrylic polymer with a molecular weight distribution of not more than 1.8 as prepared by the living radical polymerization technique proposed in, inter alia, Japanese Kokai Publication 2000-178456. The polymers made via SGO process which are produced by Toagosei Co., Ltd. and Johnson Polymer Corporation as reported in the August, 1998 issue (p. 110) of Kogyo Zairyo can also be utilized. The SGO polymers can be produced by subjecting acrylate monomers to continuous bulk polymerization at high temperature and pressure. Usually the polymers which are liquid at room temperature and have no functional group are employed. These may be used each independently or in a combination of two or more species. Where necessary, these may be used in combination with a low molecular plasticizer within the range not adversely affecting physical properties.

These plasticizers having an acrylic component may be acrylic polymers not having a reactive silicon containing group or acrylic polymers having a reactive silicon containing group. By utilizing the hydroxyl group of a hydroxyl group-containing polymer made via SGO process, the reactive silicon containing group can be introduced by the same method as the above-described method of introducing a reactive silicon containing group for the production of the polyoxyalkylene polymer having a reactive silicon containing group (b). The acrylic polymer having a reactive silicon containing group functions as a reactive plasticizer, helping to eliminate bleeding of a plasticizer from the cured product, among other effects. When the reactive silicon containing group exists in the number of more than 1 per mole of the polymer on the average, the tensile properties of the cured product are greatly affected. The plasticizer having an acrylic component (c), such as an acrylic polymer, which has a reactive silicon containing group in the number of not more than 1 on the average per mole is preferred as said reactive plasticizer.

Regarding the amount of use of the plasticizer having an acrylic component (c) relative to a combined total of 100 weight parts of the vinyl polymer having a reactive silicon containing group (a) and polyoxyalkylene polymer having a reactive silicon containing group (b), the lower limit is preferably 5 weight parts, more preferably 10 weight parts, still more preferably 20 weight parts. The upper limit is preferably 150 weight parts, more preferably 120 weight parts, still more preferably 100 weight parts. If the upper limit is less than 5 weight parts, the plasticizing effect tends to be scarcely expressed. If it exceeds 150 weight parts, the mechanical strength of the cured product tends to be insufficient. And, such a plasticizer may be formulated in the stage of synthesis of the polymer.

For curing the composition of the invention, a curing catalyst need not necessarily be used. When a curing catalyst is to be used, conventionally known catalysts can be used. As specific examples of the curing catalyst, silanol condensation catalysts including titanium compounds such as tetrabutyl titanate, tetrapropyl titanate, tetraacetylacetonate titanium, etc.; tetravalent tin compounds such as dibutyltin dilaurate, dibutyltin maleate, dibutyltin phthalate, dibutyltin dioctanoate, dibutyltin di(ethyl hexanoate), dibutyltin di(methyl maleate), dibutyltin di(ethyl maleate), dibutyltin di(butyl maleate), dibutyltin di(octyl maleate), dibutyltin di(tridecyl maleate), dibutyltin di(benzyl maleate), dibutyltin diacetate, dioctyltin di(ethyl maleate), dioctyltin di(octyl maleate), dibutyltin dimethoxide, dibutyltin di(nonyl phenoxide), dibutenyltin oxide, dibutyltin di(acetyl acetonate), dibutyltin di(ethyl acetoacetate), reaction products of dibutyltin oxide with phthalic esters, etc.; divalent tin compounds such as stannous octanoate, tin naphthenate, stannous stearate, etc.; organoaluminum compounds such as aluminum tris(acetylacetonate), aluminum tris(ethyl acetoacetate), diisopropoxyaluminum-ethyl acetoacetate, etc.; zirconium compounds such as zirconium tetraacetylacetonate etc.; lead octanoate; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5.4.0)undecene-7 (DBU), etc. or salts of these amine compounds with carboxylic acids etc.; low molecular weight polyamide resins obtainable from an excess of a polyamine with polybasic acids; reaction products of an excess of a polyamine with epoxy compounds; silane coupling agents having an amino group such as γ-aminopropyltrimethoxysilane, N-(β-aminoethyl)aminopropylmethyldimethoxysilane, etc.; other known silanol condensation catalysts such as other acid catalysts and basic catalysts, among others, can be mentioned. These catalysts may be used each independently or in a combination of two or more species.

The amount of use of such a curing catalyst relative to a combined total of 100 weight parts of the vinyl polymer having a reactive silicon containing group (a) and polyoxyalkylene polymer having a reactive silicon containing group (b) is preferably about 0.1 to 20 weight parts, more preferably about 1 to 10 weight parts. Too low amount of use of the curing catalyst is not preferable, because the curing speed is decreased and the curing reaction does not proceed sufficiently. On the other hand, too high amount of use of the curing catalyst is not preferable, because local exothermic reaction and foaming take place in curing and a good cured product cannot be easily obtained.

For the purpose of enhancing the activity of the condensation catalyst, the curable composition of the invention may be supplemented with a silicon compound having no silanol group which may be represented by the general formula:

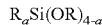

(wherein the R groups each independently represents a substituted or unsubstituted hydrocarbon group of 1 to 20 carbon atoms; a represents any of 0, 1, 2, and 3). This silicon compound is not restricted but the compounds of the above general formula wherein R is an aryl group of 6 to 20 carbon atoms, such as phenyltrimethoxysilane, phenylmethyldimethoxysilane, phenyldimethylmethoxysilane, diphenyldimethoxysilane, diphenyldiethoxysilane, and triphenylmethoxysilane, are preferred because these are especially effective in accelerating the curing reaction of the composition. In consideration of cost and availability, diphenyldimethoxysilane and diphenyldiethoxysilane are particularly preferred. The formulating amount of this silicon compound is preferably about 0.01 to 20 weight parts, more preferably 0.1 to 10 weight parts, based on a combined total of 100 weight parts of the vinyl polymer having a reactive silicon containing group (a) and polyoxyalkylene polymer having a reactive silicon containing group (b). If the formulating amount of the silicon compound is below the above range, the accelerating effect on the curing reaction tends to be insufficient. On the other hand, if the formulating amount of the silicon compound exceeds the above range, the hardness and tensile strength of the cured product tend to be decreased.

The composition of the invention may be supplemented with a silane coupling agent, a reaction product of a silane coupling agent, or a compound other than a silane coupling agent as an adhesion-imparting agent. Specifically, the silane coupling agent includes isocyanato group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, etc.; amino group-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, etc.; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, etc.; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, β-(3,4-epoxycyclohexyl)ethyltriethoxysilane, etc.; carboxysilanes such as β-carboxyethyltriethoxysilane, β-carboxyethylphenylbis(2-methoxyethoxy)silane, N-β-(carboxymethyl)aminoethyl-γ-aminopropyltrimethoxysilane, etc.; vinyl type unsaturated group-containing silanes such as vinyltrimethoxysilane, vinyltriethoxysilane, γ-methacryloyloxypropylmethyldimethoxysilane, γ-acryloyloxypropylmethyltriethoxysilane, etc.; halogen-containing silanes such as γ-chloropropyltrimethoxysilane etc.; and isocyanurate silanes such as tris(trimethoxysilyl) isocyanurate and so forth. Furthermore, the modification derivatives of these silanes, such as amino-modified silyl polymers, silylated amino group-containing polymers, unsaturated aminosilane complexes, phenylamino(long-chain)alkylsilanes, aminosilylated silicones, silylated polyesters, etc. may also be used likewise as silane coupling agents. In the present invention, the silane coupling agent is used generally within the range of 0.1 to 20 weight parts, particularly preferably 0.5 to 10 weight parts, based on a combined total of 100 weight parts of the vinyl polymer having a reactive silicon containing group (a) and polyoxyalkylene polymer having a reactive silicon containing group (b).

Regarding the effect of the silane coupling agent added to the curable composition of the invention, when the composition is applied to various adherends, namely inorganic substrates such as glass, aluminum, stainless steel, zinc, copper, mortar, etc. or organic substrates such as poly(vinyl chloride), acrylic resins, polyesters, polyethylene, polypropylene, polycarbonates, etc., the silane coupling agent produces marked improvements in adhesion whether under non-primer conditions or under primer conditions. The adhesion-improving effect on various adherends is particularly pronounced when it is used under non-primer conditions. As specific examples of the adhesion-imparting agent other than silane coupling agents, there can be mentioned but not particularly limited to epoxy resins, phenol resins, sulfur, alkyl titanates, and aromatic polyisocyanates, among others. These adhesion-imparting agents may be used each independently or as a mixture of two or more different species. By adding such an adhesive-imparting agent, the adhesion to various adherends can be improved.

The composition of the invention may be supplemented with various fillers. Among such fillers are reinforcing fillers such as fumed silica, precipitated silica, crystalline silica, fused silica, dolomite, silicic anhydride, hydrous silicic acid, and carbon black; such fillers as ground calcium carbonate, colloidal calcium carbonate, magnesium carbonate, diatomaceous earth, calcined clay, clay, talc, titaniumdioxide, bentonite, organic bentonite, ferric oxide, aluminum dust, flint powder, zinc oxide, activated zinc white, Shirasuballoons, glass microballoons, organic microballoons such as phenol resin and vinylidene chloride resin microballoons, and resin powders such as PVC powder and PMMA powder; fibrous fillers such as asbestos, glass fibers and filaments, and so forth.

When it is desired to obtain a cured product of high hardness by using such a filler, it is advantageous to use a filler selected chiefly from fumed silica, precipitated silica, crystalline silica, fused silica, dolomite, silicic anhydride, hydrous silicic acid, carbon black, surface-treated microfine calcium carbonate, calcined clay, clay, activated zinc white, among others, and satisfactory results are obtained when such a filler or fillers are used in a proportion of 1 to 100 weight parts relative to a combined total of 100 weight parts of said vinyl polymer having a reactive silicon containing group (a) and polyoxyalkylene polymer having a reactive silicon containing group (b). Furthermore, when it is desired to obtain a cured product with low strength and high elongation at break, it is advantageous to use a filler or fillers selected chiefly from titanium dioxide, calcium carbonate, magnesium carbonate, talc, ferric oxide, zinc oxide, silas balloons, among others, in a proportion of 5 to 200 weight parts based on a combined total of 100 weight parts of said vinyl polymer having a reactive silicon containing group (a) and polyoxyalkylene polymer having a reactive silicon containing group (b). In this connection, calcium carbonate is generally characterized in that the larger its surface area, the greater is the degree of improvement in the strength at break, elongation at break, and adhesion of the cured product. Of course, these fillers may be used each independently or as a mixture of two or more different species.

For the purpose of improving the workability (knife-releasability and other properties) of the composition and giving a matte effect on the surface of the cured product, addition of organic balloons or inorganic balloons is preferred. These fillers may be surface-treated and can be used each species independently or as a mixture of two or more different species. For improving the workability (knife-releasability and other properties), the particle size of balloons is preferably not more than 0.1 mm. For imparting a matte effect to the surface of the cured product, the preferred size is 5 to 300 µm.

By virtue of the satisfactory weather resistance of the cured product, the composition of the invention can be applied with advantage to the joints of exterior walls of houses, such as siding boards, particularly ceramic siding boards but it is preferable to match the sealing material design to the siding design. As exterior walls, in particular, those with a deluxe feeling created by spatter coating or incorporation of colored aggregates are used these days. When a scaly or particulate substance not less smaller 0.1 mm, preferably about 0.1 to 5.0 mm, in diameter is formulated into the composition of the invention, the cured product matches up well with such deluxe-finished exterior walls and, in addition, shows good weather resistance. Thus, the composition is enabled to give a cured product capable of retaining the attractive appearance over years. When a particulate substance is formulated, a pebbled or sandstone-like coarse surface texture can be expressed. When a scaly substance is formulated, an irregular surface resulting from its scaly shape can be expressed.

The preferred diameter, formulating amount, constituent material, etc. of such scaly or particulate substances are described in Japanese Kokai Publication Hei-09-53063, as follows.

The diameter is not less than 0.1 mm, preferably about 0.1 to 5.0 mm, and a suitable size is selected according to the exterior wall material, design, and the like. Scaly substances and particulate substances measuring about 0.2 mm to 5.0 mm in diameter and those measuring about 0.5 mm to 5.0 mm can also be employed. In the case of a scaly substance, its thickness is about ⅒ to ⅕ of its diameter (ca. 0.01 to 1.00 mm). The scaly or particulate substance is either premixed with the main sealing material and transported, as such, to the field or mixed with the main sealing material in the field before application.

The scaly or particulate substance is formulated in a proportion of about 1 to 200 weight parts relative to 100 weight parts of the sealing material composition. The formulating amount is judiciously selected according to the size of the scaly or particulate substance, the exterior wall material and design, and so forth.

As the scaly or particulate substance, natural materials such as silica sand, mica, etc., synthetic rubbers, synthetic resins, and inorganic materials such as alumina are used. To enhance the decorative effect of joints after application, the material can be colored to a suitable shade matching the siding material, design, and the like.

The preferred finishing method and other particulars are disclosed in Japanese Kokai Publication Hei-09-53063.

When balloons (preferably with a mean particle diameter not less than 0.1 mm) are used for the same purpose as above, a pebbled or sandstone-like coarse texture can be obtained and, in addition, a reduction in weight can be realized. The preferred diameter, formulating amount, constituent material, etc. of such balloons are described in Japanese Kokai Publication Hei-10-251618, as follows.

Balloons are hollow spherical fillers. The material for such balloons includes inorganic materials such as glass, silas, silica, etc. and organic materials such as phenol resins, urea resins, polystyrenes, Saran, etc. but these are not exclusive choices. Thus, it may be a composite of inorganic and organic materials or a laminate comprising a plurality of layers of such materials. Thus, any of inorganic, organic, and composite balloons can be employed. The balloons for use may be balloons of one and the same material or a mixture of balloons of different materials. Furthermore, balloons having a processed or coated surface can be used and even otherwise balloons surface-treated with various finishing agents may also be used. For example, organic balloons coated with calcium carbonate, talc, titanium dioxide, or the like and inorganic balloons subjected to a surface treatment with a silane coupling agent can be mentioned.

In order to obtain a pebbled or a sandstone-like coarse surface, the diameter of individual balloons is preferably not less than 0.1 mm. Balloons measuring about 0.2 to 5.0 mm or about 0.5 to 5.0 mmin diameter can also be used. If the diameter is less than 0.1 mm, formulating a large quantity of balloons tends to cause only a viscosity gain of the composition, not contributing to the expression of a coarse texture. The formulating amount of balloons can be easily selected according to the desired degree of coarseness of the pebbled or sandstone-like texture. It is usually recommendable to formulate balloons not smaller than 0.1 mm in diameter in a proportion of 5 to 25 vol % based on the volume of the composition. If the volume concentration of balloons is less than 5 vol %, no coarse texture can be obtained. If it exceeds 25 vol %, the sealing material will gain too much in viscosity to obtain sufficient workability and the modulus of the cured product will be increased so that the fundamental performance as a sealing material tends to be impaired. The volume concentration which is particularly preferred for achieving a balance with the fundamental performance required of a sealing material is 8 to 22 vol %.

In using balloons, the composition may be supplemented with an anti-slip agent such as the one described in Japanese Kokai Publication 2000-154368 and an amine compound for further imparting a matte effect to the irregular surface of the cured product, particularly a primary and/or secondary amine having a melting point of not less than 35° C., as discribed in Japanese Kokai Publication 2001-164237.

Specific examples of balloons are described in Japanese Kokai Publication Hei-02-129262, Japanese Kokai Publication Hei-04-8788, Japanese Kokai Publication Hei-04-173867, Japanese Kokai Publication Hei-05-1225, Japanese Kokai Publication Hei-07-113073, Japanese Kokai Publication Hei-09-53063, Japanese Kokai Publication Hei-10-251618, Japanese Kokai Publication 2000-154368, Japanese Kokai Publication 2001-164237, and WO97/05201, among other publications.

When the composition of the invention contains particles of cured sealing material, the cured product is formed with surface irregularities, thus improved in the decorative effect. The preferred diameter, formulating amount, constituent material, etc. of said particles of cured sealing material are as described in Japanese Kokai Publication 2001-115142, as follows. The preferred diameter is 0.1 to 1 mm, more preferably about 0.2 to 0.5 mm. The formulating amount is preferably 5 to 100 weight %, more preferably 20 to 50 weight %, in the curable composition. The constituent material is not particularly restricted provided that it can be used as a sealing material and includes urethane resins, silicones, modified silicones, polysulfide rubber, etc., although a modified silicone type sealing material is preferred.

The composition of the invention may be supplemented with a suitable other plasticizer component in addition to said plasticizer having an acrylic component. The plasticizer component mentioned just above is not particularly restricted but, depending on purposes such as adjustment of physical properties and adjustment of physical state, the following substances can be used each independently or as a mixture of two or more species: namely phthalic esters such as dibutyl phthalate, diheptyl phthalate, di(2-ethylhexyl) phthalate, butyl benzyl phthalate, etc.; non-aromatic dibasic acid esters such as dioctyl adipate, dioctyl sebacate, dibutyl sebacate, isodecyl succinate, etc.; fatty acid esters such as butyl oleate, methyl acetylricioleate, etc.; esters of polyalkylene glycols, such as diethylene glycol dibenzoate, triethylene glycol dibenzoate, pentaerythritol esters, etc.; phosphoric esters such as tricresyl phosphate, tributyl phosphate, etc.; trimellitic esters; chlorinated paraffins; hydrocarbon oils such as alkyldiphenyls, partially hydrogenated terphenyl, etc.; process oils; polyethers such as polyethylene glycol, polypropylene glycol, etc.; epoxy plasticizers such as epoxidized soybean oil, benzyl epoxystearate, etc.; and polyester plasticizers. However, these are not necessarily essential. These plasticizers can be formulated in the stage of polymer synthesis. The plasticizer having an acrylic component (c) is generally expensive and the use of it in combination with other plasticizers often results in cost reduction. When such other plasticizers are used in combination with the plasticizer having an acrylic component (c) in formulations of the composition of the invention, the case in which the weight ratio of the plasticizer having an acrylic component to the other plasticizer or plasticizers is not less than 70/30 is superior to the case in which the ratio is less than 70/30 as far as weather resistance is concerned. From the standpoint of compatibility, the plasticizers other than the plasticizer having an acrylic component (c) are preferably phthalic esters and polyethers.

Where necessary, the curable composition of the invention may be supplemented with a physical state-modulating agent for adjusting the tensile properties of the cured product. The physical state-modulating agent is not particularly restricted but includes, inter alia, alkylalkoxysilanes such as methyltrimethoxysilane, dimethyldimethoxysilane, trimethylmethoxysilane, n-propyltrimethoxysilane, etc.; alkoxysilanes having a functional group such as alkylisopropenoxysilane, e.g. dimethyldiisopropenoxysilane, methyltriisopropenoxysilane and γ-glycidoxypropylmethyldiisopropenoxysilane, γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, γ-mercaptopropylmethyldimethoxysilane, etc.; silicone varnishes; and polysiloxanes, among others. By using such a physical state-modulating agent, the cured product available on cure of the composition of the invention can be so adjusted as to increase its hardness or conversely decrease its hardness and increase its elongation at break. The physical state-modulating agents mentioned above may be used each independently or in a combination of two or more species.

Where necessary, the curable composition of the invention may be supplemented with a thixotropic agent (antisagging agent) for preventing sagging and contributing to workability. The antisagging agent is not particularly restricted but includes, inter alia, polyamide waxes; hydrogenated castor oil derivatives; and metal soaps such as calcium stearate, aluminum stearate, barium stearate, and so forth. These thixotropic agents (antisagging agents) can be used each independently or in a combination of two or more species.

The composition of the invention may be supplemented with an epoxy resin and used as an elastic adhesive or the like. The epoxy resin mentioned just above includes but is not limited to epichlorohydrin-bisphenol A type epoxy resin, epichlorohydrin-bisphenol F type epoxy resin, tetrabromobisphenol A glycidyl ether and other fire-retardant epoxy resins, novolak type epoxy resin, hydrogenated bisphenol A type epoxy resin, bisphenol A-propylene oxide adduct glycidyl ether type epoxy resin, p-hydroxybenzoic acid glycidyl ether ester epoxy resin, m-aminophenol epoxy resin, diaminodiphenylmethane epoxy resin, urethane-modified epoxy resin, various alicyclic epoxy resins, N,N-diglycidylaniline, N,N-diglycidyl-o-toluidine, triglycidyl isocyanurate, polyalkylene glycol diglycidyl ethers, glycerin or other polyhydric alcohol glycidyl ethers, hydantoin epoxy resins, and unsaturated polymer epoxides such as petroleum resin. Thus, any of the common epoxy resins can be used. The epoxy resin having at least 2 epoxy groups within the molecule is preferred partly because it is highly reactive in curing and partly because it is more likely to give a three-dimensional network on curing. As further preferred examples, bishphenol A type epoxy resin and novolak type epoxy resin can be mentioned. The amount of use of such epoxy resin based on a combined total weight of the vinyl polymer having a reactive silicon containing group (a) and polyoxyalkylene polymer having a reactive silicon containing group (b) is ((a)+(b))/epoxy resin=100/1 to 1/100 by weight. If the ((a)+(b))/epoxy resin ratio is less than 1/100, the improving effect on impact strength and toughness of the cured epoxy resin will hardly be obtained. If the ((a)+(b))/epoxy resin ratio exceeds 100/1, the strength of the cured oxyalkylene polymer will be insufficient. The preferred ratio varies according to uses of the curable resin composition and other factors and cannot be stated in general terms but when, for example, it is desired to improve the impact resistance, flexibility, toughness, peel strength, etc. of the cured epoxy resin, it is recommendable to use 1 to 100 weight parts, preferably 5 to 100 weight parts of ((a) component+(b) component) relative to 100 weight parts of epoxy resin. On the other hand, when it is desired to improve the strength of cured ((a) component+(b) component), it is recommendable to use 1 to 200 weight parts, preferably 5 to 100 weight parts, of the epoxy resin relative to 100 weight parts of ((a) component+(b) component).

Of course, a curing agent for curing the epoxy resin can be used in combination with the composition of the invention. The curing agent for epoxy resin that can be used is not particularly restricted but includes the common curing agents for epoxy resin. Specifically, there can be mentioned primary or secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine-terminated polyethers, etc.; tertiary amines such as 2,4,6-tris(dimethylaminomethyl)phenol, tripropylamine, etc.; salts of these tertiary amines; polyamide resins; imidazoles; dicyandiamides; boron trifluoride complex compounds, carboxylic acid anhydrides such as phthalic anhydride, hexahydrophthalic anhydride, tetrahydrophthalic anhydride, dodecinylsuccinic anhydride, pyromellitic anhydride, chlorendic anhydride, etc.; alcohols; phenols; carboxylic acids; aluminum or zirconium diketone complex compounds, and so forth. These curing agents may also be used each independently or in a combination of two or more species.

When a curing agent for epoxy resin is used, its amount of use is 0.1 to 300 weight parts based on 100 weight parts of the epoxy resin.

A ketimine can be used as the curing agent for epoxy resin. The ketimine remains stable in the absence of moisture but decomposes into a primary amine and a ketone by the presence of moisture and the primary amine thus produced functions as a room temperature-curable curing agent for epoxy resin. With a ketimine, a one-package type composition can be provided. The ketimine can be obtained by the condensation reaction between an amine compound and a carbonyl compound.

For synthesizing ketimines, the known amine compounds and carbonyl compounds can be used. Thus, for example, the amine compound which can be used includes diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, p,p'-biphenylenediamine, etc.; polyamines such as 1,2,3-triaminopropane, triaminobenzene, tris(2-aminoethyl)amine, tetra(aminomethyl)methane, etc.; polyalkylenepolyamines such as diethylenetriamine, triethylenetriamine, tetraethylenepentamine, etc.; polyoxyalkylene polyamines; and aminosilanes such as γ-aminopropyltriethoxysilane, N-(β-aminoethyl)-γ-aminopropyltrimethoxysilane, N-(β-aminoethyl)-γ-aminopropylmethyldimethoxysilane, etc.; among others. The carbonyl compound which can be used includes aldehydes such as acetaldehyde, propionaldehyde, n-butyraldehyde, isobutyraldehyde, diethylacetaldehyde, glyoxal, benzaldehyde, etc.; cyclic ketones such as cyclopentanone, trimethylcyclopentanone, cyclohexanone, trimethylcyclohexanone, etc.; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone, etc.; and β-dicarbonyl compounds such as acetylacetone, methyl acetoacetate, ethyl acetoacetate, dimethyl malonate, diethyl malonate, methyl ethyl malonate, dibenzoylmethane, and so forth.

In the case where an imino group is present in a ketimine, the imino group may be reacted with styrene oxide, a glycidyl ether such as butyl glycidyl ether, allyl glycidyl ether or the like, or a glycidyl ester. The ketimines mentioned above may be used each independently or in a combination of two or more species. The amount of use of the ketimine is 1 to 100 weight parts relative to 100 weight parts of the epoxy resin and varies with different species of epoxy resin and ketimine.

Where necessary, the curable composition of the invention may be supplemented with various additives for modulating various physical properties of the curable composition or those of the cured product. Among such additives are fire retardants, curability modulators, modulus control agents such as compounds having one silanol group within the molecule, antioxidants, radical inhibitors, ultraviolet absorbers, metal inactivators, ozone aging inhibitors, light stabilizers, phosphorus type peroxide decomposers, lubricants, pigments, foaming agents, solvents, photocurable resins such as polyfunctional acrylic resins, oxygen-curable compounds, e.g. drying oils such as tung oil, linseed oil, etc., and antifungal agents, among others. Any of these additives may be used each independently or in a combination of two or more species. Specific examples of such additives are described in, inter alia, Japanese Kokoku Publication Hei-04-69659, Japanese Kokoku Publication Hei-07-108928, Japanese Kokai Publication Sho-63-254149, Japanese Kokai Publication Sho-64-22904, and Japanese Kokai Publication 2001-72854.

The curable composition of the invention can be prepared in the form of a one-package system such that all the components are sealed into a single package and, after application, allowed to cure in situ in the presence of moisture in the air or in the form of a two-package system such that the curing catalyst, filler, plasticizer, water, etc. are formulated together in advance as a curing component and this formulated material is admixed with the polymer composition just before application.

In case the curable composition is prepared as a one-package system, where all the components are formulated in advance, it is recommendable to dehydrate/dry the moisture-containing components before formulating or dehydrate them by, for example, pressure reduction during the blending operation. In case the curable composition is prepared as a two-package system, it is not necessary to formulate a curing catalyst into the main package containing the polymers having a reactive silicon containing group so that it is not likely that the presence of a minor amount of moisture in the formulated components will cause gelation but if a long-term shelf-life is desired, a dehydration/drying procedure is preferably carried out. The preferred procedure of dehydration/drying is drying by heating in the case of solids such as powders or vacuum drying or dehydration over synthetic zeolite, active alumina, silica gel or the like in the case of liquids. An alternative dehydration method comprises formulating a small amount of an isocyanate compound so as to let the isocyanato group react with water. In addition to such dehydration/drying procedures, the addition of a lower alcohol, such as methanol or ethanol, or an alkoxysilane compound, such as n-propyltrimethoxysilane, vinyltrimethoxysilane, vinylmethyldimethoxysilane, γ-mercaptopropylmethyldimethoxysilane, γ-mercaptopropylmethyldiethoxysilane, γ-glycidoxypropyltrimethoxysilane or the like, results in a further increase in shelf-life.

In using the curable composition of the invention, such additives as a lubricant, a pigment, a foaming agent, etc. may be further added each in a suitable amount, where necessary.

The curable composition of the invention is particularly useful as an elastic sealant which finds application in the field of buildings, ships, road vehicles, roads and the like. It is especially of use as a sealant for joints of siding boards of which weather resistance and workability are required. Furthermore, with or without the aid of a primer, the composition is capable of adhering intimately to a broad variety of adherends inclusive of glass, ceramics, wood, metals and shaped resin articles so that it can be used in various forms of sealing compositions and adhesive compositions as well. As to adhesives, it can be provided not only as an ordinary adhesive but also as a contact adhesive. The composition is further useful as a food packaging material, a casting rubber material, a template material or a coating material.

Particularly a curable composition comprising a alkyl acrylate and/or alkyl methacrylate polymer having a reactive silicon containing group in the form of a random copolymer, a polyoxypropylene polymer having a substantially straight-chain molecular chain and a reactive silicon containing group, whose number average molecular weight is 16,000 to 25,000, and a plasticizer which is an alkyl acrylate polymer having a molecular weight lower than said alkyl acrylate and/or alkyl methacrylate polymer having a reactive silicon containing group is quite suitable for use as a sealing material for ceramic siding boards. Thus, the cured product from this composition exhibits an excellent weather resistance as a sealing material for ceramic siding boards and, compared with the cured composition using the conventional plasticizer, has a large elongation at break. In addition, despite the fact that this curable composition comprises a random-copolymerized (meth)acrylate polymer having a high viscosity as the vinyl polymer having a reactive silicon containing group and that it comprises a high viscosity straight-chain polyoxypropylene polymer having a high molecular weight of not less than 16,000 as the polyoxyalkylene polymer having a reactive silicon containing group, the composition has a viscosity within the range suitable for sealing material use and has a curing speed not much different from the speed of the composition containing a polyoxypropylene polymer of low molecular weight. The lower limit to the number average molecular weight of said polyoxypropylene polymer having a reactive silicon containing group in this composition is preferably 17,000, more preferably 18,000, particularly preferably 19,000 and the upper limit is preferably 23,000, particularly preferably 22,000. The most preferred range is 19,000 to 22,000 but combinations of other lower and upper limits are also preferred.

In the above composition, said alkyl acrylate polymer of low molecular weight for use as the plasticizer is preferably the polymer synthesized by the so-called SGO process obtained by high-temperature, high-pressure continuous bulk polymerization of acrylate monomers.

BEST MODE FOR CARRYING OUT THE INVENTION

The following examples illustrate the present invention in further detail without defining the scope of the invention.

EXAMPLE OF SYNTHESIS-1

To a solution of the following monomer mixture in toluene heated to 105° C. was added a solution of the polymerization initiator 2,2'-azobis(2-methylbutyronitrile) dropwise over 5 hours. Thereafter, a "post polymerization" was carried out for 1 hour to give a vinyl copolymer.

Methyl methacrylate 14.5 wt. parts, butyl acrylate 68.5 wt. parts, stearyl methacrylate 15 wt. parts, γ-methacryloxypropylmethyldimethoxysilane 2 wt. parts, 2,2'-azobis(2-methylbutyronitrile) 0.5 wt. part.

EXAMPLE OF SYNTHESIS-2

A pressure-resisting glass reactor equipped with a stirrer was charged with 500 g of an allyl-terminated straight-chain poly(propylene oxide) having a number average molecular weight of 9,400 and 10 g of hexane and azeotropic dehydration was carried out at 90° C. The hexane was then distilled off under reduced pressure, and after nitrogen purging, 40 µl of vinyl-platinum catalyst (5 wt. % as platinum in isopropyl alcohol) was added and, under stirring, 9.8 g of DMS (dimethoxymethylsilane) was gently added dropwise. This mixture was reacted at 90° C. for 2 hours, after which the unreacted DMS was distilled off under reduced pressure to recover a silylated polymer. This polymer was blended with the copolymer prepared in Example of Synthesis-1 in a solids weight ratio of 70/30 and the solvent was then distilled off to give a solvent-free polymer (A).

EXAMPLE OF SYNTHESIS-3

A pressure-resisting glass reactor equipped with a stirrer was charged with 500 g of an allyl-terminated branched-chain poly(propylene oxide) having a number average molecular weight of 17,000 and comprising a main chain skeleton obtained by using a double metal cyanide complex catalyst and 10 g of hexane and azeotropic dehydration was carried out at 90° C. The hexane was then distilled off under reduced pressure, and after nitrogen purging, 40 µl of a chloroplatinic acid catalyst (5 wt. % as platinum in isopropyl alcohol) was added and, under stirring, 5.8 g of DMS (dimethoxymethylsilane) was gently added dropwise. This mixture was reacted at 90° C. for 2 hours, after which the unreacted DMS was distilled off under reduced pressure to recover a silylated polymer. This polymer was blended with the copolymer prepared in Example of Synthesis-1 in a solids weight ratio of 70/30 and the solvent was then distilled off to give a solvent-free polymer (B).

EXAMPLE OF SYNTHESIS-4

A pressure-resisting glass reactor equipped with a stirrer was charged with 500 g of an allyl-terminated straight-chain poly(propylene oxide) having a number average molecular weight of 20, 000 and comprising a main chain skeleton obtained by using a double metal cyanide complex catalyst and 10 g of hexane and azeotropic dehydration was carried out at 90° C. The hexane was then distilled off under reduced pressure, and after nitrogen purging, 20 µl of a chloroplatinic acid catalyst (5 wt. % as platinum in isopropyl alcohol) was added and, under stirring, 4.6 g of DMS (dimethoxymethylsilane) was gently added dropwise. This mixture was reacted at 90° C. for 2 hours, after which the unreacted DMS was distilled off under reduced pressure to recover a silylated polymer. This polymer was blended with the copolymer prepared in Example of Synthesis-1 in a solids weight ratio of 70/30 and the solvent was then distilled off to give a solvent-free polymer (C).

The viscosity of the polymer corresponding to the blending ratio of 75/25 was 49.8 Pa·s; that of the polymer corresponding to the blending ratio of 70/30 was 60.7 Pa·s, and that of the polymer corresponding to the blending ratio of 65/35 was 86.2 Pa·s (all as measured with a type BM viscometer using a No. 4 rotor, 23° C.).

EXAMPLE OF SYNTHESIS-5

A pressure-resisting glass reactor equipped with a stirrer was charged with 500 g of an allyl-terminated straight-chain poly(propylene oxide) having a number average molecular weight of 8,000 and 10 g of hexane and azeotropic dehydration was carried out at 90° C. The hexane was then distilled off under reduced pressure, and after nitrogen purging, 40 µl of vinyl-platinum catalyst (5 wt. % as platinum in isopropyl alcohol) was added and, under stirring, 7.6 g of DMS (dimethoxymethylsilane) was gently added dropwise. This mixture was reacted at 90° C. for 2 hours, after which the unreacted DMS was distilled off under reduced pressure to recover a silylated polymer (D).

EXAMPLE OF SYNTHESIS-6

<Synthesis of an Acrylic Plasticizer>

A 2 L-separable flask equipped with reflux condenser and stirrer was charged with CuBr (22.4 g, 0.156 mol), followed by nitrogen purging. Acetonitrile (112 mL) was then added and the mixture was stirred on an oil bath at 70° C. for 30 minutes. Then, butyl acrylate (0.20 kg), methyl 2-bromopropionate (86.9 g, 0.520 mol), and pentamethyldiethylenetriamine (0.19 mL, 0.18 g, 1.04 mmol) (hereinafter abbreviated as triamine) were added and the reaction was started. Under stirring and heating at 70° C., butyl acrylate (0.80 kg) was continuously added dropwise over 150 minutes. Triamine (1.81 mL, 1.71 g, 9.88 mmol) was further added during the dropwise addition of butyl acrylate. Then, the mixture was stirred under heating at 70° C. for 230 minutes. This reaction mixture was diluted with toluene and passed through an activated alumina column and the volatile fraction was distilled off under reduced pressure to give a polymer (PBA). This polymer had a number average molecular weight of 2,600 and a molecular weight distribution of 1.18.

EXAMPLE 1

<Main Component>

To 100 weight parts of the polymer (A) prepared in Example of Synthesis-2, 96 wt. parts of the acrylic plasticizer prepared in Example of Synthesis-6, 160 wt. parts of calcium carbonate colloid (product of Maruo Calcium Co.: trade name; Calfine 200M), 50 wt. parts of heavy calcium carbonate (product of Maruo Calcium Co.: trade name; Super S), 3 wt. parts of antisagging agent (product of Kusumoto Chemicals, Ltd.: trade name; Disparlon 305), 3 wt. parts of surface modifier (product of Toagosei Co., Ltd.: trade name; Aronix M309), 1 wt. part of hindered amine type light stabilizer (product of Sankyo Co., Ltd.: trade name; Sanol LS770), benzotriazole series UV absorber (product of Ciba Specialty Chemicals Ltd.: trade name; Tinuvin 327) were added and the whole mixture was kneaded and passed through a 3-roll mill to give 414 wt. parts of a main component.

<Curing Component>

First, 21 wt. parts of heavy calcium carbonate (product of Maruo Calcium Co.: tradename; Super S), 2 wt. parts of kaolin (product of Tsuchiya Kaolin Co.: trade name; ASP170), and 16 wt. parts of a poly(propylene glycol) with a number average molecular weight of 3,000 (product of Takeda Chemical Industries, Ltd.: trade name; Actcall P-23) were blended and dried in advance. Then, 0.18 wt. part of vinyltrimethoxysilane, 1 wt. part of an aminosilane compound (product of Nippon Unicar Co., Ltd.: trade name; A-1120), 3 wt. parts of stannous octanoate, 0.75 wt. part of laurylamine, and 1 wt. part of tetravalent tin (product of Sankyo Organic Chemicals. Co.: trade name; No. 918) were blended and sufficiently kneaded, passed through a small 3-roll paint mill 3 times, and dehydrated under reduced pressure at 50° C. for about 5 minutes to give 44.93 wt. parts of a curing component. This curing component was hermetically packaged in a moisture-proof container.

The above main component and curing component were kneaded together and processed to give a 250 µm-thick cured sheet sample.

EXAMPLE 2

Using 100 wt. parts of the polymer (B) prepared in Example of Synthesis-3 instead of the polymer (A) formulated in the main component, the procedure of Example 1 was otherwise repeated to give a main component. This main component and the curing component described in Example 1 were kneaded together to prepare a 250 µm-thick cured sheet sample.

EXAMPLE 3

Using 100 wt. parts of the polymer (C) prepared in Example of Synthesis-4 instead of the polymer (A) formulated in the main component, the procedure of Example 1 was otherwise repeated to give a main component. This main component and the curing component described in Example 1 were kneaded together to prepare a 250 µm-thick cured sheet sample.

EXAMPLE 4

The polymer (C) 100 wt. parts prepared in Example of Synthesis-4, 55 wt. parts of the plasticizer having an acrylic component (Toagosei Co., Ltd.: UP-1020: a low molecular weight acrylic polymer with a viscosity 400 mPa·s/25° C., a weight average molecular weight of 1,500, and a glass transition temperature −66° C./DSC), 120 wt. parts of calcium carbonate colloid (product of Shiraishi Kogyo: trade name; CCR), 20 wt. parts of titanium dioxide (product of Ishihara Sangyo: trade name; R820), 2 wt. parts of an antisagging agent (product of Kusumoto Chemicals, Ltd.: trade name; Disparlon 6500), 1 wt. part of a benzotriazole series UV absorber (product of Ciba Specialty Chemicals Ltd.: trade name; Tinuvin 327), 1 wt. part of a hindered amine type light stabilizer (product of Sankyo Co., Ltd.: Sanol LS770), and 0.45 wt. part of carbon black (product of Asahi Carbon Co., Ltd.: trade name; #55) were weighed, blended, sufficiently kneaded, and passed through a compact 3-roll mill for a total of 3 times. Thereafter, 2 wt. parts of vinyltrimethoxysilane, 3 wt. parts of an aminosilane compound (product of Nippon Unicar Co., Ltd.: trade name; A-1120), and 2 wt. parts of tetravalent tin (product of Nitto Kasei Co., Ltd.: trade name; U-220) were added and the whole was thoroughly blended to prepare a curable composition. Using this composition, a 250 μm-thick cured sheet sample was prepared.

COMPARATIVE EXAMPLE 1

Using 96 wt. parts of diisodecyl phthalate (hereinafter abbreviated as DIDP; product of Kyowa Hakko Kogyo Co., Ltd.: trade name; DIDP) instead of the acrylic plasticizer formulated in the main component, the procedure of Example 1 was otherwise repeated to give a main component. This main component and the curing component described in Example 1 were kneaded together to prepare a 250 μm-thick cured sheet sample.

COMPARATIVE EXAMPLE 2

Using 96 wt. parts of polypropylene glycol with a number average molecular weight of 3,000 (hereinafter abbreviated as PPG 3000; product of Takeda Chemical Industries, Ltd.: trade name; Actcall P-23) instead of the acrylic plasticizer formulated in the main component, the procedure of Example 1 was otherwise repeated to give a main component. This main component and the curing component described in Example 1 were kneaded together to prepare a 250 μm-thick cured sheet sample.

COMPARATIVE EXAMPLE 3

Using 96 wt. parts of diisodecyl phthalate (product of Kyowa Hakko Kogyo Co., Ltd.: trade name; DIDP) instead of the acrylic plasticizer formulated in the main component, the procedure of Example 2 was otherwise repeated to give a main component. This main component and the curing component described in Example 1 were kneaded together to prepare a 250 μm-thick cured sheet sample.

COMPARATIVE EXAMPLE 4

Using 96 wt. parts of polypropylene glycol with a number average molecular weight of 3,000 (product of Takeda Chemical Industries, Ltd.: trade name; Actcall P-23) instead of the acrylic plasticizer formulated in the main component, the procedure of Example 2 was otherwise repeated to give a main component. This main component and the curing component described in Example 1 were kneaded together to prepare a 250 μm-thick cured sheet sample.

COMPARATIVE EXAMPLE 5

Using 96 wt. parts of diisodecyl phthalate (product of Kyowa Hakko Kogyo Co., Ltd.: trade name; DIDP) instead of the acrylic plasticizer formulated in the main component, the procedure of Example 3 was otherwise repeated to give a main component. This main component and the curing component described in Example 1 were kneaded together to prepare a 250 μm-thick cured sheet sample.

COMPARATIVE EXAMPLE 6

Using 96 wt. parts of polypropylene glycol with a number average molecular weight of 3,000 (product of Takeda Chemical Industries, Ltd.: trade name; Actcall P-23) instead of the acrylic plasticizer formulated in the main component, the procedure of Example 3 was otherwise repeated to give a main component. This main component and the curing component described in Example 1 were kneaded together to prepare a 250 μm-thick cured sheet sample.

COMPARATIVE EXAMPLE 7

Using 100 wt. parts of polymer (D) instead of the polymer (A) formulated in the main component, the procedure of Example 1 was otherwise repeated to give a main component. This main component and the curing component described in Example 1 were kneaded together to prepare a 250 μm-thick cured sheet sample.

COMPARATIVE EXAMPLE 8

Using 96 wt. parts of diisodecyl phthalate (product of Kyowa Hakko Kogyo Co., Ltd.: trade name; DIDP) instead of the acrylic plasticizer formulated in the main component, the procedure of Comparative Example 7 was otherwise repeated to give a main component. This main component and the curing component described in Example 1 were kneaded together to prepare a 250 μm-thick cured sheet sample.

COMPARATIVE EXAMPLE 9

Using 96 wt. parts of polypropylene glycol with a number average molecular weight of 3,000 (product of Takeda Chemical Industries, Ltd.: trade name; Actcall P-23) instead of the acrylic plasticizer formulated in the main component, the procedure of Comparative Example 7 was otherwise repeated to give a main component. This main component and the curing component described in Example 1 were kneaded together to prepare a 250 μm-thick cured sheet sample.

Using the weather resistance test samples prepared in Examples 1 to 4 and Comparative Examples 1 to 9, an accelerated weathering test using a sunshine weatherometer was preformed to monitor the time course of aging of each sample. The results are presented in Table 1.

TABLE 1

| Sample | Polymer | Plasticizer | 0 hr | 60 hr | 180 hr | 280 hr | 340 hr | 400 hr | 460 hr | 520 hr | 580 hr |
|---|---|---|---|---|---|---|---|---|---|---|---|
| Example 1 | A | PBA | ◯ | ◯ | ◯ | ◯ | ◯ | ◯ | ◯ | ◯ | ◯ |
| Example 2 | B | PBA | ◯ | ◯ | ◯ | ◯ | ◯ | ◯ | ◯ | ◯ | ◯ |
| Example 3 | C | PBA | ◯ | ◯ | ◯ | ◯ | ◯ | ◯ | ◯ | ◯ | ◯ |
| Example 4 | C | UP-1020 | ◯ | ◯ | ◯ | ◯ | ◯ | ◯ | ◯ | ◯ | ◯ |
| Compar. Exam. 1 | A | DIDP | ◯ | ◯ | ◯ | ◯ | ◯ | △ | △ | △ | △ |
| Compar. Exam. 2 | A | PPG3000 | ◯ | ◯ | ◯ | ◯ | ◯ | △ | △ | X | X |
| Compar. Exam. 3 | B | DIDP | ◯ | ◯ | ◯ | ◯ | △ | X | X | X | X |
| Compar. Exam. 4 | B | PPG3000 | ◯ | ◯ | ◯ | ◯ | ◯ | ◯ | ◯ | ◯ | ◯ |
| Compar. Exam. 5 | C | DIDP | ◯ | ◯ | ◯ | ◯ | ◯ | △ | △ | △ | X |

TABLE 1-continued

| Sample | Polymer | Plasticizer | | | | | | | | | |
|---|---|---|---|---|---|---|---|---|---|---|---|
| Compar. Exam. 6 | C | PPG3000 | ○ | ○ | ○ | ○ | ○ | Δ | X | X | X |
| Compar. Exam. 7 | D | PBA | ○ | ○ | ○ | Δ | X | X | X | X | X |
| Compar. Exam. 8 | D | DIDP | ○ | ○ | Δ | X | X | X | X | X | X |
| Compar. Exam. 9 | D | PPG3000 | ○ | ○ | Δ | X | X | X | X | X | X |

| Sample | Polymer | Plasticizer | 640 hr | 700 hr | 760 hr | 1000 hr | 1300 hr | 1540 hr | 1600 hr | 1660 hr | 1720 hr | 2000 hr |
|---|---|---|---|---|---|---|---|---|---|---|---|---|
| Example 1 | A | PBA | ○ | ○ | ○ | ○ | ○ | ○ | Δ | Δ | Δ | Δ |
| Example 2 | B | PBA | ○ | ○ | ○ | ○ | ○ | ○ | ○ | ○ | Δ | Δ |
| Example 3 | C | PBA | ○ | ○ | ○ | ○ | ○ | ○ | ○ | Δ | Δ | Δ |
| Example 4 | C | UP-1020 | ○ | ○ | ○ | ○ | ○ | ○ | ○ | ○ | ○ | ○ |
| Compar. Exam. 1 | A | DIDP | Δ | Δ | Δ | X | X | X | X | X | X | X |
| Compar. Exam. 2 | A | PPG3000 | X | X | X | X | X | X | X | X | X | X |
| Compar. Exam. 3 | B | DIDP | X | X | X | X | X | X | X | X | X | X |
| Compar. Exam. 4 | B | PPG3000 | Δ | Δ | X | X | X | X | X | X | X | X |
| Compar. Exam. 5 | C | DIDP | X | X | X | X | X | X | X | X | X | X |
| Compar. Exam. 6 | C | PPG3000 | X | X | X | X | X | X | X | X | X | X |
| Compar. Exam. 7 | D | PBA | X | X | X | X | X | X | X | X | X | X |
| Compar. Exam. 8 | D | DIDP | X | X | X | X | X | X | X | X | X | X |
| Compar. Exam. 9 | D | PPG3000 | X | X | X | X | X | X | X | X | X | X |

○: No change,
Δ: Aging (cracks) occurs but is not so severe,
X: Severe aging

It will be apparent from Table 1 that the cured products according to Examples 1 to 4 are by far superior to the cured products according to Comparative Examples 1 to 9 in weather resistance.

weathering test using a sunshine weatherometer to monitor the time course of aging was performed of each sample. The results are presented, alongside the results of Example 1 and Comparative Example 1, in Table 2.

TABLE 2

| Sample | Plasticizer PBA/DIDP | 0 hr | 60 | 120 | 180 | 240 | 300 | 360 | 420 | 480 | 540 | 600 | 660 | 720 | 780 | 840 |
|---|---|---|---|---|---|---|---|---|---|---|---|---|---|---|---|---|
| Example 1 | 100/0 | ○ | ○ | ○ | ○ | ○ | ○ | ○ | ○ | ○ | ○ | ○ | ○ | ○ | ○ | ○ |
| Example 5 | 80/20 | ○ | ○ | ○ | ○ | ○ | ○ | ○ | ○ | ○ | ○ | ○ | ○ | ○ | ○ | ○ |
| Example 6 | 70/30 | ○ | ○ | ○ | ○ | ○ | ○ | ○ | ○ | ○ | ○ | ○ | ○ | ○ | ○ | ○ |
| Example 7 | 50/50 | ○ | ○ | ○ | ○ | ○ | ○ | ○ | ○ | ○ | ○ | ○ | Δ | Δ | Δ | Δ |
| Example 8 | 30/70 | ○ | ○ | ○ | ○ | ○ | ○ | ○ | ○ | ○ | Δ | Δ | Δ | Δ | Δ | Δ |
| Example 9 | 10/90 | ○ | ○ | ○ | ○ | ○ | ○ | ○ | ○ | ○ | Δ | Δ | Δ | Δ | Δ | Δ |
| Compar. Exam. 1 | 0/100 | ○ | ○ | ○ | ○ | ○ | ○ | ○ | Δ | Δ | Δ | Δ | Δ | Δ | X | X |

| Sample | Plasticizer PBA/DIDP | 900 | 960 | 1020 | 1080 | 1140 | 1200 | 1260 | 1320 | 1380 | 1440 | 1500 | 1560 | 1620 | 1680 | 1740 |
|---|---|---|---|---|---|---|---|---|---|---|---|---|---|---|---|---|
| Example 1 | 100/0 | ○ | ○ | ○ | ○ | ○ | ○ | ○ | ○ | ○ | ○ | ○ | ○ | Δ | Δ | Δ |
| Example 5 | 80/20 | ○ | ○ | ○ | Δ | Δ | Δ | Δ | Δ | Δ | X | X | X | X | X | X |
| Example 6 | 70/30 | ○ | Δ | Δ | Δ | Δ | Δ | Δ | X | X | X | X | X | X | X | X |
| Example 7 | 50/50 | Δ | X | X | X | X | X | X | X | X | X | X | X | X | X | X |
| Example 8 | 30/70 | Δ | X | X | X | X | X | X | X | X | X | X | X | X | X | X |
| Example 9 | 10/90 | Δ | X | X | X | X | X | X | X | X | X | X | X | X | X | X |
| Compar. Exam. 1 | 0/100 | X | X | X | X | X | X | X | X | X | X | X | X | X | X | X |

○: No change,
Δ: Aging (cracks) occurs but is not so severe,
X: Severe aging

EXAMPLES 5 TO 9

Except that, as the plasticizer to be formulated in the main component, the acrylic plasticizer PBA obtained in Example of Synthesis-6 and DIDP were used in a combined total of 96 wt. parts and in a PBA/DIDP weight ratio of 80/20, 70/30, 50/50, 30/70, or 10/90, the procedure of Example 1 was repeated to give a series of main components. Each of these main components and the curing component described in Example 1 were kneaded together to prepare a 250 μm-thick cured sheet sample. Using these weather resistance test samples according to Examples 5 to 9, an accelerated It will be apparent from Table 2 that increasing the proportion of the acrylic plasticizer to 70 weight % or more of the total plasticizer results in marked improvements in weather resistance.

EXAMPLE 10

A plasticizer having an acrylic component (product of Toagosei Co., Ltd.: trade name; UP-1020), 120 wt. parts of calcium carbonate (product of Shiraishi Kogyo: trade name; CCR), 20 wt. parts of titanium dioxide (product of Ishihara Sangyo: trade name; R-820), 2 wt. parts of a thixotropic agent (product of Kusumoto Chemicals Ltd.: trade name;

D-6500), 1 wt. part of a benzotriazole series UV absorber (product of Ciba Specialty Chemicals Ltd.: trade name; Tinuvin 327), and 1 wt. part of a hindered amine series light stabilizer (product of Sankyo Co., Ltd.: trade name; Sanol LS770) were weighed and blended with the polymer 100 wt. parts prepared in Example of Synthesis-4 and the whole mixture was thoroughly kneaded and passed through a compact 3-roll paint mill for a total of 3 times. Thereafter, 2 wt. parts of vinyltrimethoxysilane, 3 wt. parts of an aminosilane compound (product of Nippon Unicar Co., Ltd.: trade name; A-1120), and 2 wt. parts of a cure accelerator (product of Nitto Kasei Co., Ltd.: trade name; U-220) were added and kneaded to prepare a 3 mm-thick cured sheet sample defined by JIS A5758 which was further processed into a dumbbell testpiece for tensile testing (JIS A type).

EXAMPLE 11

Except that a straight-chain poly(propylene oxide) having a number average molecular weight of 10,000 and comprising a main chain skeleton obtained by using a double metal cyanide complex catalyst as the polyoxyalkylene polymer having a reactive silicon containing group (b) instead of the polymer prepared in Example of Synthesis-4, the procedure of Example 10 was otherwise repeated to give a polymer (E) and a curable composition. Then, a dumbbell testpiece for tensile testing (JIS A type) was prepared. The molecular weight of the allyl-terminated poly (propylene oxide) used as the constituent material of the above component (b) was approximately equal to the molecular weight of the reactive silicon containing group-terminated poly(propylene oxide).

Using the dumbbell testpieces for tensile testing as prepared in Example 10 and Example 11, respectively, a tensile test was performed using an autograph (product of Shimadzu Corporation, model AG500C) to measure the elongation at break (Eb). The surface hardening time and residual tack of each formulation were also determined. The results are shown in Table 3.

TABLE 3

|  |  | Example 10 | Example 11 |
|---|---|---|---|
| Number average molecular weight |  | 20,000 | 10,000 |
| Surface hardening time | min. | 48 | 42 |
| Residual tack | After 3 days | ○~◎ | ○~◎ |
|  | After 7 days | ○~◎ | ○~◎ |
| Dumbbell tensile test | Eb % | 710 | 350 |

Residual tack criteria:
◎: Substantially no tack
○: Slight tack

It will be apparent from Table 3 that a gain in number average molecular weight is accompanied by an improvement in elongation at break, while the curability remains almost unchanged.

COMPARATIVE EXAMPLE 10

Using DIDP (diisodecyl phthalate) instead of the plasticizer having an acrylic component UP-1020, the procedure of Example 10 was otherwise repeated to give a dumbbell testpiece for tensile testing (JIS A type).

COMPARATIVE EXAMPLE 11

Using PPG with a number average molecular weight of 3,000 instead of the plasticizer having an acrylic component UP-1020, the procedure of Example 10 was otherwise repeated to give a dumbbell testpiece for tensile testing (JIS A type).

Using the dumbbell testpieces for tensile testing as prepared in Example 10 and Comparative Examples 10 and 11, a tensile test was performed using an autograph (product of Shimadzu Corporation, model AG500C) to measure the elongation at break. The results are shown in Table 4.

TABLE 4

| Sample | Polymer | Plasticizer | M100(MPa) | Tb(MPa) | Eb(%) |
|---|---|---|---|---|---|
| Example 10 | C | UP-1020 | 0.32 | 1.91 | 710 |
| Compar. Exam. 10 | C | DIDP | 0.32 | 1.77 | 640 |
| Compar. Exam. 11 | C | PPG | 0.32 | 1.74 | 690 |

It will be apparent from Table 4 that the cured product obtained from the composition of the invention has an improved elongation at break as compared with the cured products obtained from the like compositions containing the conventional plasticizers.

As an SGO polymer which is a kind of plasticizer having an acrylic component, Johnson Polymer Corporation's JDX-P1000 is known. JDX-P1000 is a low molecular acrylic polymer with a viscosity of 1,000 mPa·s/25° C., a weight average molecular weight of 3,000, and a glass transition temperature of −60° C./DSC. In Examples 1 to 11, JDX-P1000 can be used instead of the plasticizer PBA or UP-1020.

Further, an SGO polymer having about one reactive silicon containing group per molecule can be synthesized by reacting J.P.C's JDX-H2030, which is an SGO polymer having a hydroxyl group (viscosity 3,000 mPa·s/25° C., weight average molecular weight 2,000, glass transition temperature −63° C./DSC, and hydroxyl value 120 mg-KOH/g), with γ-isocyanatopropyldimethoxymethylsilane (OCNCH$_2$CH$_2$CH$_2$Si(CH$_3$) (OCH$_3$)$_2$). In Examples 1 to 11, this SGO polymer having a reactive silicon containing group can be used as a plasticizer substituting for part or the whole of the plasticizer PBA or UP-1020.

To the main components of the compositions according to Examples 1 to 3 and 5 to 9, stearylamine, which is a primary amine having a melting point of not lower than 35° C. (Farmin 80, product of Kao Corporation), can be added in a proportion of 3 wt. parts per 100 wt. parts of the solvent-free polymer (A), (B), or (C) and ceramic balloons (E-SPHERES SL350, mean particle dia. 250 μm, product of Taiheiyo Cement) can also be added in a proportion of 20 vol % of the whole main component. In this case, the surface of the cured product is provided with a pebbled texture without brilliance. When polyacrylonitrile balloons surface-treated with calcium carbonate (trade name MFL-80CA, mean particle dia. 100 μm, specific gravity 0.13; product of Matsumoto Yushi-Seiyaku Co., Ltd.) are used instead of ceramic balloons, the cured product presents with a coarse surface texture without brilliance.

In the compositions according to Examples 4 and 10 to 11, ceramic balloons (E-SPHERES SL350, mean particle dia. 250 μm, product of Taiheiyo Cement) and polyacrylonitrile balloons surface-treated with calcium carbonate (trade name MFL-80CA, mean particle dia. 100 μm, specific gravity 0.13; product of Matsumoto Yushi-Seiyaku Co., Ltd.) may be added in a proportion of 20 vol. % of the whole composition. The resulting cured product presents with a pebbled or coarse texture.

In the compositions according to Examples 4 and 10 to 11, 14-mesh (ca. 1.8 mm and less) round flakes of synthetic resin (about 0.3 mm thick) can be formulated as the scaly material in a proportion of about 20 wt. parts based on 100 wt. parts of the whole composition. By rubbing the joint filled with the resulting sealing material in several strokes in the same direction, a product presenting with a relief pattern of the scaly materials can be obtained.

In the above Examples and Comparative Examples, the polymer prepared in Example of Synthesis-1 can be replaced with the butyl acrylate polymer described in Production Example 1 in Japanese Kokai Publication 2000-178456, namely a polymer having a GPC number average molecular weight (polystyrene equivalent) of 15,000 and a molecular weight distribution (Mw/Mn) of 1.4 and containing 2.0 silyl groups per molecule on average, can be used. Thus, in Examples of Synthesis 2 to 4, the polymer according to Production Example 1 in Japanese Kokai Publication 2000-178456 is used instead of the copolymer obtained in Example of Synthesis-1 and the polymers obtained in the same manner as Examples of Synthesis-2 to 4 are designated as polymer (A2), polymer (B2), and polymer (C2), respectively. Furthermore, referring to Example 11, the polymer obtained by using the polymer according to Production Example 1 in Japanese Kokai Publication 2000-178456 instead of the polymer according to Example of Synthesis-1 as the vinyl polymer component having a reactive silicon containing group (a) of polymer (E) is now designated as polymer (E2). In Examples 1 to 11 and Comparative Examples 1 to 11, the polymer (A), polymer (B), polymer (C) and polymer (E) may be replaced with the polymer (A2), polymer (B2), polymer (C2) and polymer (E2). Furthermore, in Examples 1 to 3 and 5 to 9, the polymer (A), polymer (B), and polymer (C) may be replaced with the polymer (A2), polymer (B2) and polymer (C2), respectively, in the preparation of main components of the composition and, to these main components, a stearylamine (Farmin 80, product of Kao Corporation), which is a primary amine having a melting point not lower than 35° C., may be added in a proportion of 3 weight parts per 100 weight parts of said polymer (A2), (B2) or (C2) and, further, ceramic balloons (E-SPHERES SL350, mean particle diameter 250 μm; product of Taiheiyo Cement) may also be added in a proportion of 20 vol % based on the whole main component. The resulting cured products invariably present with a pebbled surface texture without brilliance. When polyacrylonitrile balloons surface-treated with calcium carbonate (trade name MFL-80CA, mean particle diameter 100 μm, specific gravity 0.13; product of Matsumoto Yushi-Seiyaku Co., Ltd.) are used instead of ceramic balloons, the cured product presents with a coarse surface texture without brilliance. Furthermore, in Examples 1 to 11, the polymer (A), polymer (B), polymer (C) and polymer (E) may be replaced with polymer (A2), polymer (B2), polymer (C2) and polymer (E2), respectively, and the plasticizer PBA or UP-1020 may be replaced with JDX-P1000.

INDUSTRIAL APPLICABILITY

The cured product available from the curable composition of the invention has a quite laudable weather resistance.

The invention claimed is:

1. A curable composition which comprises a vinyl polymer having a reactive silicon containing group (a), a polyoxyalkylene polymer having a reactive silicon containing group (b), and a plasticizer having an acrylic component (c), wherein the plasticizer is at least one of a (meth) acrylic polymer with a molecular weight distribution of not more than 1.8 as prepared by the living radical polymerization technique, and an acrylic polymer produced by subjecting acrylate monomers to continuous bulk polymerization.

2. The curable composition according to claim 1, wherein the vinyl polymer having a reactive silicon containing group (a) is a (meth)acrylic polymer.

3. The curable composition according to claim 1, wherein the polyoxyalkylene polymer (b) is at least one member selected from the group consisting of poly (ethylene oxide), poly(propylene oxide), polypropylene oxide-ethylene oxide copolymer, and poly(butylene oxide).

4. The curable composition according to claim 1, wherein the main chain skeleton of the polyoxyalkylene polymer (b) is a polymer synthesized by using a double metal cyanide complex catalyst.

5. The curable composition according to claim 1, wherein the number average molecular weight of the polyoxyalkylene polymer (b) is 500 to 50,000.

6. The curable composition according to claim 5, wherein the number average molecular weight of the polyoxyalkylene polymer (b) is 1,000 to 30,000.

7. The curable composition according to claim 1, wherein the number average molecular weight of the polyoxyalkylene polymer (b) is not less than 12,000.

8. The curable composition according to claim 7, wherein the number average molecular weight of polyoxyalkylene polymer (b) is not less than 15,000.

9. The curable composition according to claim 8, wherein the number average molecular weight of polyoxyalkylene polymer (b) is not less than 16,000.

10. The curable composition according to claim 3, wherein the polyoxyalkylene polymer (b) is a polyoxypropylene polymer.

11. The curable composition according to claim 10, wherein the main chain skeleton of the polyoxyalkylene polymer (b) is a substantially straight-chain polymer.

12. The curable composition according to claim 1, wherein the reactive silicon containing group of the polyoxyalkylene polymer (b) is a group comprising one silicon atom and two hydrolyzable groups attached thereto.

13. The curable composition according to claim 12, wherein the reactive silicon containing group of the polyoxyalkylene polymer (b) is dimethoxymethylsilyl group.

14. The curable composition according to claim 1, wherein the number average molecular weight of the vinyl polymer having a reactive silicon containing group (a) is 5,000 to 30,000.

15. The curable composition according to claim 1, wherein the weight ratio of the vinyl polymer having a reactive silicon containing group (a) to the polyoxyalkylene polymer having a reactive silicon containing group (b) is 25/75 to 45/55.

16. The curable composition according to claim 1, wherein the number average molecular weight of the plasticizer having an acrylic component (c) is 500 to 15,000.

17. The curable composition according to claim 16, wherein the number average molecular weight of the plasticizer having an acrylic component (c) is 1,000 to 8,000.

18. The curable composition according to claim 1, wherein the amount of use of the plasticizer having an acrylic component (c) is 5 to 150 weight parts relative to a combined total of 100 weight parts of the vinyl polymer having a reactive silicon containing group (a) and polyoxyalkylene polymer having a reactive silicon containing group (b).

19. The curable composition according to claim 18, wherein the amount of use of the plasticizer having an acrylic component (c) is 10 to 120 weight parts relative to a combined total of 100 weight parts of the vinyl polymer having a reactive silicon containing group (a) and polyoxyalkylene polymer having a reactive silicon containing group (b).

20. The curable composition according to claim 19, wherein the amount of use of the plasticizer having an acrylic component (c) is 20 to 100 weight parts relative to a combined total of 100 weight parts of the vinyl polymer having a reactive silicon containing group (a) and polyoxyalkylene polymer having a reactive silicon containing group (b).

21. The curable composition according to claim 1, which further comprises another plasticizer in addition to the plasticizer having an acrylic component (c).

22. The curable composition according to claim 21, wherein the weight ratio of the plasticizer having an acrylic component (c) to said other plasticizer is not less than 70/30.

23. The curable composition according to claims 1, which is for use as a siding board joint sealant.

24. The curable composition according to claim 23, wherein the siding board is a ceramic siding board.

25. The curable composition according to claims 1, which further comprises a scaly or particulate substance not smaller than 0.1 mm in diameter.

26. The curable composition according to claim 1, which further comprises a balloon.

27. The curable composition according to claim 26, wherein the diameter of the balloon is not less than 0.1 mm.

* * * * *